(12) United States Patent
Monroe

(10) Patent No.: US 11,537,778 B2
(45) Date of Patent: *Dec. 27, 2022

(54) SYSTEMS, METHODS, AND MEDIA FOR MANAGING AND SHARING DIGITAL CONTENT AND SERVICES

(71) Applicant: Mixonium Group Holdings, Inc., Corrales, NM (US)

(72) Inventor: Marshall McLaury Monroe, Corrales, NM (US)

(73) Assignee: Mixonium Group Holdings, Inc., Corrales, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,928

(22) Filed: Jan. 4, 2021

(65) Prior Publication Data

US 2021/0264095 A1  Aug. 26, 2021

Related U.S. Application Data

(63) Continuation of application No. 16/847,557, filed on Apr. 13, 2020, now Pat. No. 10,885,264, which is a
(Continued)

(51) Int. Cl.
*G06F 17/00* (2019.01)
*G06F 40/103* (2020.01)
(Continued)

(52) U.S. Cl.
CPC .......... *G06F 40/103* (2020.01); *G06F 3/0482* (2013.01); *G06F 3/04842* (2013.01)

(58) Field of Classification Search
CPC ...... G06F 17/212; G06F 17/24; G06F 17/211; G06F 17/2247; G06F 40/103; G06F 3/0482; G06F 3/04842
See application file for complete search history.

(56) References Cited

U.S. PATENT DOCUMENTS 6,081,262 A    6/2000 Gill et al.
8,239,425 B1   8/2012 Bell et al.
(Continued)

OTHER PUBLICATIONS

International Preliminary Report on Patentability dated May 12, 2016 in International Patent Application No. PCT/US2014/062704, pp. 1-7.
(Continued)

*Primary Examiner* — Hassan Mrabi
(74) *Attorney, Agent, or Firm* — Byrne Poh LLP

(57) ABSTRACT

Methods, systems, and media for creating a layout of digital assets are provided. In some embodiments, the method comprises: presenting a layout of digital assets, wherein the layout of digital assets includes a plurality of elements; receiving a selection of a digital asset from a group of available digital assets to be included in the layout of digital assets; in response to receiving the selection of the digital asset, causing a representation of the digital asset to be presented in the layout of digital assets; causing an image that represents the layout of digital assets to be created, wherein the image is associated with a Uniform Resource Locator (URL); and in response to determining that the URL has been selected, causing the image to be presented.

24 Claims, 16 Drawing Sheets

Related U.S. Application Data continuation-in-part of application No. 16/181,039, filed on Nov. 5, 2018, now Pat. No. 10,621,270, which is a continuation of application No. 14/526,233, filed on Oct. 28, 2014, now abandoned.

(60) Provisional application No. 61/896,346, filed on Oct. 28, 2013.

(51) Int. Cl.
  *G06F 3/04842* (2022.01)
  *G06F 3/0482* (2013.01)

(56) References Cited

U.S. PATENT DOCUMENTS

| | | |
|---|---|---|
| 8,407,576 B1 | 3/2013 | Yin |
| 9,244,917 B1 | 1/2016 | Sharma et al. |
| 9,507,480 B1 | 11/2016 | Hui et al. |
| 9,524,273 B2 * | 12/2016 | Horton ................. G06F 40/143 |
| 2008/0215965 A1 | 9/2008 | Abrams et al. |
| 2008/0215985 A1 | 9/2008 | Batchelder et al. |
| 2009/0012935 A1 | 1/2009 | Beged-Dov et al. |
| 2010/0194753 A1 | 8/2010 | Robotham et al. |
| 2010/0245351 A1 | 9/2010 | Sellem |
| 2011/0065082 A1 | 3/2011 | Gal et al. |
| 2011/0105187 A1 | 5/2011 | Dobroth et al. |
| 2011/0202430 A1 | 8/2011 | Narayanan et al. |
| 2012/0011021 A1 | 1/2012 | Wang et al. |
| 2012/0110064 A1 | 5/2012 | Chen |
| 2013/0024757 A1 | 1/2013 | Doll et al. |
| 2013/0051772 A1 | 2/2013 | Ramaswamy et al. |
| 2013/0080897 A1 | 3/2013 | Han et al. |
| 2013/0129165 A1 | 5/2013 | Dekel et al. |
| 2013/0145257 A1 * | 6/2013 | Shalabi ................. G06F 40/106 715/243 |
| 2013/0159445 A1 | 6/2013 | Zonka et al. |
| 2013/0326337 A1 | 12/2013 | Lehmann et al. |
| 2014/0067934 A1 * | 3/2014 | Ware ........................ H04L 51/32 709/204 |
| 2014/0068401 A1 | 3/2014 | Kirigin |
| 2014/0075389 A1 | 3/2014 | Kim |
| 2014/0108922 A1 * | 4/2014 | Gravity ................. G06F 40/186 715/246 |
| 2014/0215568 A1 | 7/2014 | Kirigin et al. |
| 2014/0229836 A1 | 8/2014 | Young |
| 2014/0245128 A9 | 8/2014 | Brant |
| 2014/0253801 A1 | 9/2014 | Richman et al. |
| 2014/0258473 A1 | 9/2014 | Litzenberger et al. |
| 2014/0258836 A1 | 9/2014 | Horton et al. |
| 2014/0372865 A1 | 12/2014 | Corob et al. |
| 2015/0006265 A1 | 1/2015 | White et al. |
| 2015/0019545 A1 | 1/2015 | Chedeau et al. |
| 2015/0019957 A1 | 1/2015 | Ying et al. |
| 2015/0042823 A1 | 2/2015 | Relf |
| 2015/0089401 A1 | 3/2015 | Ta |
| 2015/0113386 A1 | 4/2015 | Wu et al. |
| 2015/0149600 A1 | 5/2015 | Thibeault et al. |
| 2016/0004761 A1 | 1/2016 | Zhang et al. |
| 2016/0364773 A1 | 12/2016 | Ramaswamy et al. |

OTHER PUBLICATIONS

International Search Report and Written Opinion dated Mar. 9, 2015 in International Patent Application No. PCT/US2014/062704, pp. 1-18.

Notice of Allowance dated Sep. 3, 2020 in U.S. Appl. No. 16/847,557, pp. 2-9.

Notice of Allowance dated Dec. 30, 2019 in U.S. Appl. No. 16/181,039, pp. 2-4.

Office Action dated Jan. 3, 2017 in U.S. Appl. No. 14/526,233, pp. 2-13.

Office Action dated Oct. 5, 2017 in U.S. Appl. No. 14/526,233, pp. 2-14.

* cited by examiner

SYSTEMS, METHODS, AND MEDIA FOR MANAGING AND SHARING DIGITAL CONTENT AND SERVICES

CROSS REFERENCE TO RELATED APPLICATION

This application is a continuation of U.S. patent application Ser. No. 16/847,557, filed Apr. 13, 2020, which is a continuation-in-part of U.S. patent application Ser. No. 16/181,039, filed Nov. 5, 2018, now U.S. Pat. No. 10,621,270, which is a continuation of U.S. patent application Ser. No. 14/526,233, filed Oct. 28, 2014, which claims the benefit of U.S. Provisional Patent Application No. 61/896,346, filed Oct. 28, 2013, each of which is hereby incorporated by reference herein in its entirety.

TECHNICAL FIELD

The disclosed subject matter relates to methods, systems, and media for creating a layout of digital content.

BACKGROUND

People are increasingly interested in creating and sharing digital content and services, such as photos, videos, audio content, games, hyperlinks to Web sites, text, documents, video tele-conferences, 3D viewports, transaction carts, phone calls, live streams, health monitoring, augmented reality sessions, security systems, social media feeds, and/or aggregators, etc. Furthermore, people are interested in presenting multiple pieces of such content and services in one post that references the multiple types of assets. For example, a person might want to create a post that contains multiple photos and videos from a vacation, a link to a Web site describing the vacation location, and a link to another Web site listing hotel options at the vacation location. As another example, a person might want to integrate a live web-cam or a driving navigation service application into the post. As yet another example, a person may want to make visibility of all or a portion of this information available to only select users. In some cases, it can be useful for presented information to self-update over time. However, it can be difficult to easily create and manage posts with multiple types of digital content and/or services.

Accordingly, it is desirable to provide new methods, systems, and media for creating a layout of digital content and services.

SUMMARY

Methods, systems, and media for creating a layout of digital assets are provided. In accordance with some embodiments of the disclosed subject matter, a method for creating a layout of digital assets is provided, the method comprising: receiving, at a hardware processor, a user selection of a base form for the layout of digital assets; based on the user selection of the base form, presenting, using the hardware processor, the layout of digital assets in a layout portion of user interface presented on a display, wherein the layout of digital assets includes a plurality of elements, and wherein each element corresponds to a region of the layout of digital assets, and wherein each element can be associated with a digital asset; receiving a selection of a digital asset from a group of available digital assets to be included in the layout of digital assets; in response to receiving the selection of the digital asset, causing a representation of the digital asset to be presented in the layout of digital assets; causing an image that represents the layout of digital assets to be created, wherein the image is associated with a Uniform Resource Locator (URL) that indicates a location of the image; and in response to determining that the URL has been selected on a user device, causing the image to be presented on the user device.

In accordance with some embodiments of the disclosed subject matter, a system for creating a layout of digital assets is provided, the system comprising: a memory; and a hardware processor that, when executing computer-executable instructions stored in the memory, is configured to: receive a user selection of a base form for the layout of digital assets; based on the user selection of the base form, present the layout of digital assets in a layout portion of user interface presented on a display, wherein the layout of digital assets includes a plurality of elements, and wherein each element corresponds to a region of the layout of digital assets, and wherein each element can be associated with a digital asset; receive a selection of a digital asset from a group of available digital assets to be included in the layout of digital assets; in response to receiving the selection of the digital asset, cause a representation of the digital asset to be presented in the layout of digital assets; cause an image that represents the layout of digital assets to be created, wherein the image is associated with a Uniform Resource Locator (URL) that indicates a location of the image; and in response to determining that the URL has been selected on a user device, cause the image to be presented on the user device.

In accordance with some embodiments of the disclosed subject matter, non-transitory computer-readable media containing computer executable instructions that, when executed by a processor, cause the processor to perform a method for creating a layout of digital assets are provided, the method comprising: receiving a user selection of a base form for the layout of digital assets; based on the user selection of the base form, presenting the layout of digital assets in a layout portion of user interface presented on a display, wherein the layout of digital assets includes a plurality of elements, and wherein each element corresponds to a region of the layout of digital assets, and wherein each element can be associated with a digital asset; receiving a selection of a digital asset from a group of available digital assets to be included in the layout of digital assets; in response to receiving the selection of the digital asset, causing a representation of the digital asset to be presented in the layout of digital assets; causing an image that represents the layout of digital assets to be created, wherein the image is associated with a Uniform Resource Locator (URL) that indicates a location of the image; and in response to determining that the URL has been selected on a user device, causing the image to be presented on the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Mechanisms (which can be systems, methods, and/or media) for creating a layout of digital content are provided.

In accordance with some embodiments, these mechanisms enable users to create, enrich, modify, share, curate, and/or copy data structures each having a plurality of logical elements that can be used to represent content and services that can be presented to a user. Each of these data structures may be referred to herein as a "post." In some embodiments, any suitable types of content or services (which can be referred to herein as "digital assets") can be represented by an element of a post. For example, an element of a post can represent assets such as text (which can be for any suitable purpose, such as a story, a news piece, a description, lyrics, a blog type entry, user comments (whether the user is the author or another person), log data, etc.), an image, a video, audio, an animation, a symbol, a hypertext link (e.g., a Uniform Resource Locator (URL)), a .pdf file, a link to a Web or application service widget (e.g., a YouTube™ player, a Vimeo™ player, etc.) and/or any other suitable digital asset.

Figure 1A:
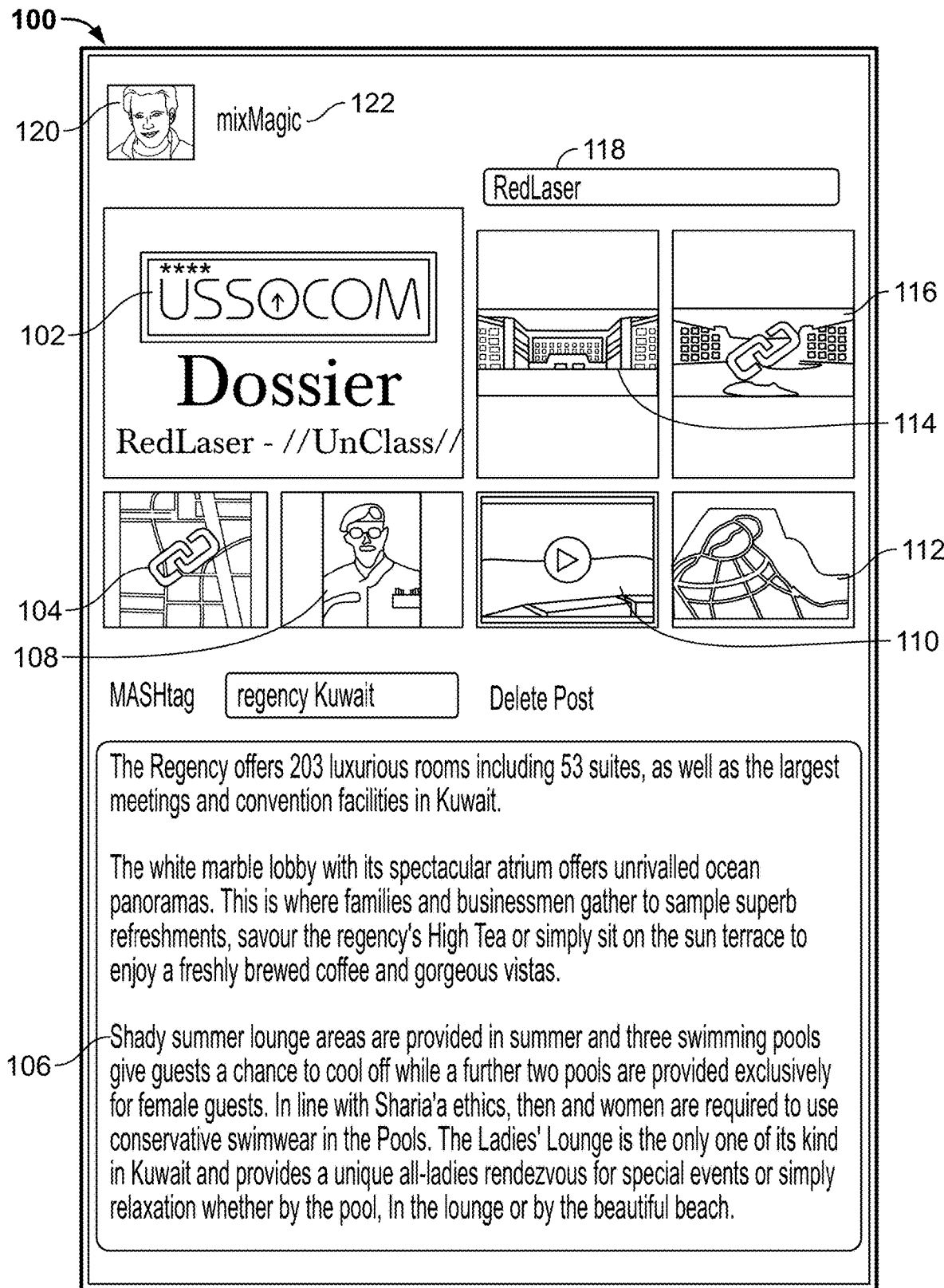
FIGS. 1A and 1B show examples of user interfaces for creating posts and for overlaying titles on digital assets included in a post in accordance with some embodiments of the disclosed subject matter.

An example 100 of a post in accordance with some embodiments is shown in FIG. 1A. As illustrated, post 100 can include elements 102, 104, 106, 108, 110, 112, 114, 116, and 118, and these elements can be arranged in a layout within the post. In some embodiments, these elements can behave like compartments each having a specified shape and size. Although these elements are each rectangular in the sample post, and the post is rectangular, any suitable shape can be used for the post and for each of the elements, in some embodiments. For example, an element within a post can be a circle, a square, a rectangle, an ellipse, a trapezoid, an irregular shape, a 3-D perspective volume, and/or any other suitable shape. As another example, a post can have any suitable shape that is defined by a combination of the shapes of its elements. Any suitable number of elements can be included in a post, in some embodiments.

As stated above, an element of a post can contain any suitable type of content or service, in some embodiments. For example, as shown in FIG. 1A, element 102 contains a graphic logo combined with text, element 104 contains a map which is referenced as a URL, element 106 contains text, element 108 contains an image, element 110 contains a video, element 102 contains a satellite photograph, element 114 contains another image, element 116 contains a link to a Web site, and element 118 contains a title.

Figure 1B:
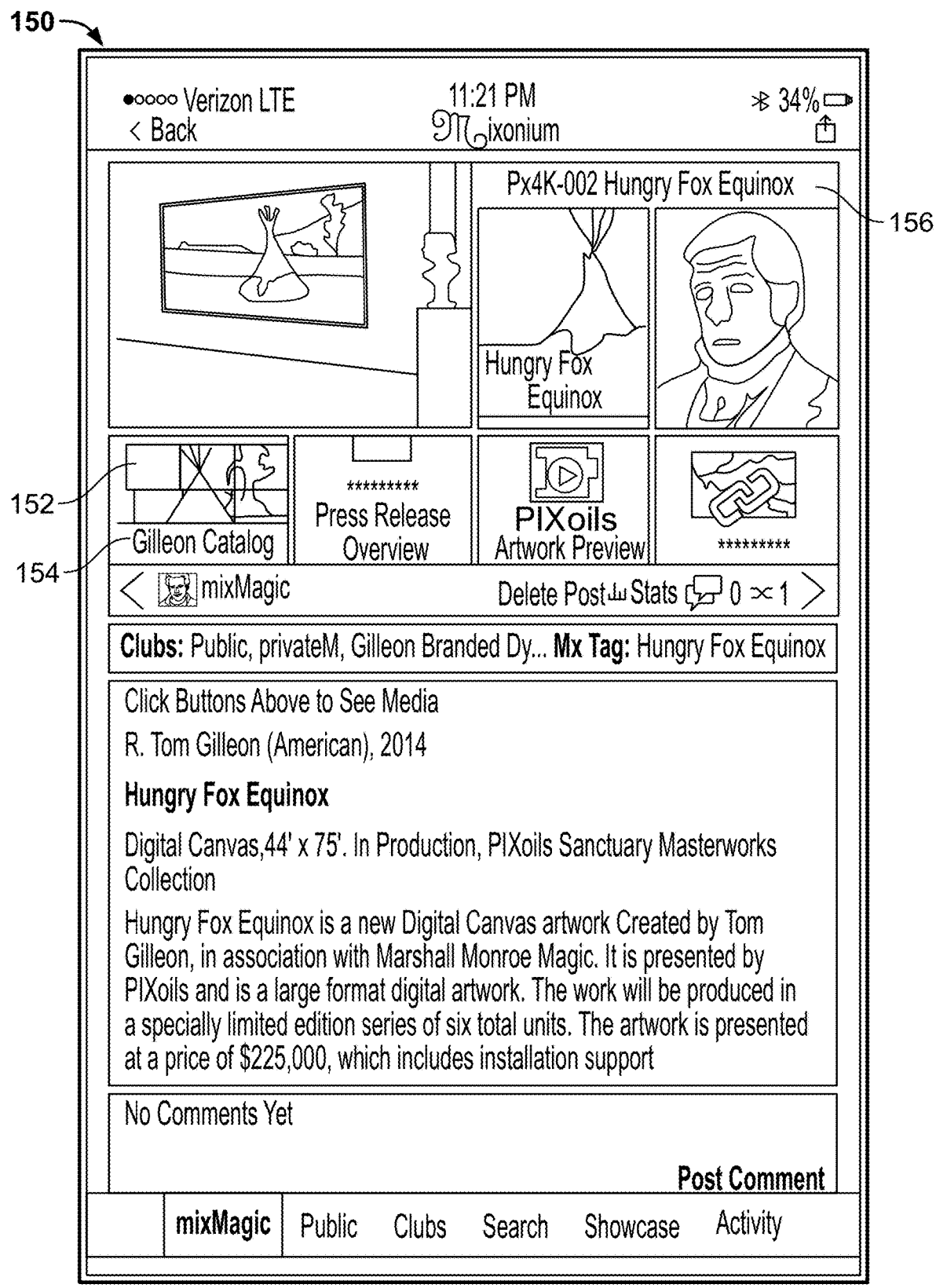

As another example, as shown in example post 150 of FIG. 1B, an element of a post can include a corresponding title (e.g., title 154 corresponding to element 152). A corresponding title can be associated with an element of a post in any suitable manner. For example, in some embodiments, the title can be overlaid on the element. Additionally or alternatively, in some embodiments, a title (e.g., title 156 of FIG. 1B) can be associated with two or more elements of a post, for example, by spanning a compartment containing the two or more elements. In some embodiments, title 154 and/or title 156 can be hidden from a user viewing post 150 until it is determined that a user has interacted with post 150 and/or an element associated with title 154 and/or 156 (e.g., by clicking on a post and/or an element, by tapping a portion of a screen corresponding to a post and/or an element, and/or any other suitable interaction input).

In some embodiments, the elements can contain the actual content to be presented, a thumbnail of the content, a link to the content (e.g., URL-hyperlink, pointer, IP address, any other suitable identifier, etc.), text representing the content, overlays that provide information about the content type and/or status of the content (e.g., an overlay can indicate if an audio file is currently playing), and/or any other suitable content or indicator of content. A link to content may link to direct assets, to Web files (HTML), or to service-type assets that can stream in a temporal fashion to the device displaying the post, in some embodiments.

The post can have any suitable characteristics associated with it, in some embodiments. For example, the post can have characteristics including topic information, categorization information, author identification information, copyright notice information, security information (e.g., encryption protocol identifiers, digital rights management information, digital signatures, authorized user lists or groups and/or corresponding access controls (e.g., limits on who can read, view, save, copy, edit, share, delete, etc.), etc.), creation date information, expiration information, post identification serial numbers, references to folders or associations to other digital list constructs, etc. Any one or more of these characteristics can be identified in a meta-tag associated with the post, and together these characteristics can be referred-to as meta-information for the post, in some embodiments.

A post can be provided for any suitable purpose in accordance with some embodiments. For example, a post can be for personal use, for business use, for commercial use, for government use, for charitable use, for religious use, and/or for any other suitable use. As a few more particular examples, a post can be used to show and describe highlights of a vacation, to show a commercial offering (e.g., products or services for sale), to provide entertainment (e.g., video content, book content, audio content, etc.), to provide information (e.g., from a news source, from an educational provider, as a tutorial, etc.), etc.

Each post can have a basic form that specifies one or more characteristics of the post and/or its elements, in some embodiments. For example, the basic form can specify geometries and relational geometries of one or more elements (e.g., visual reference compartments), characteristics of one or more elements, etc. For example, the basic form of a post can define that the post will include a given number of elements, can define the shape, size, and location of each element, can define characteristics of such elements, etc. Such characteristics can define any suitable aspects of the element(s), such as what type of content (e.g., images, video, text, hyperlinks, etc.) can be included in each element, attribution associated with each element, copy protection or notices associated with each element, commercial nature of each element (indicating that the item represented by the element is for sale, for example), advertisement or promotional status of each element, indication that an element is a live or near-live media feed, and/or any other suitable aspects, in some embodiments.

In some embodiments, a user can interact with one or more elements of a post. For example, by clicking or tapping an element of a post, the user can cause content associated with the element to be presented at a larger size. As another example, if the content of an element is video or audio, clicking on the element can cause the video or audio to begin playing. As yet another example, if the content of an element is a link, clicking on the element may cause a service in the form of a Web page corresponding to the link to be opened in a Web browser or "Viewer." As still another example, in some embodiments, selecting a post and/or an element within a post can cause a window or widget for receiving payment information (e.g., credit card information, bank account information, PayPal™ account information, and/or any other suitable payment information) from a user to appear. In instances in which a window or widget for receiving payment information is presented, the window or widget can further indicate whether payment is associated with an item that is for sale, an item that is being auctioned, a fundraiser and/or a donation to a particular cause, and/or any other suitable information. In some embodiments, a transaction or payment can be implemented using any suitable transaction service. In some embodiments, a transaction associated with a post and/or any elements of the post can be conducted using any suitable technique(s), such as using blockchain or distributed ledger-type surety systems. In some embodiments, a user can use stored value tokens, which may or may not be attached to real-world currency, to trade credits, points, and/or any other suitable unit of measure for trade in association with a post and/or assets referenced and accessed therein.

Figure 2:
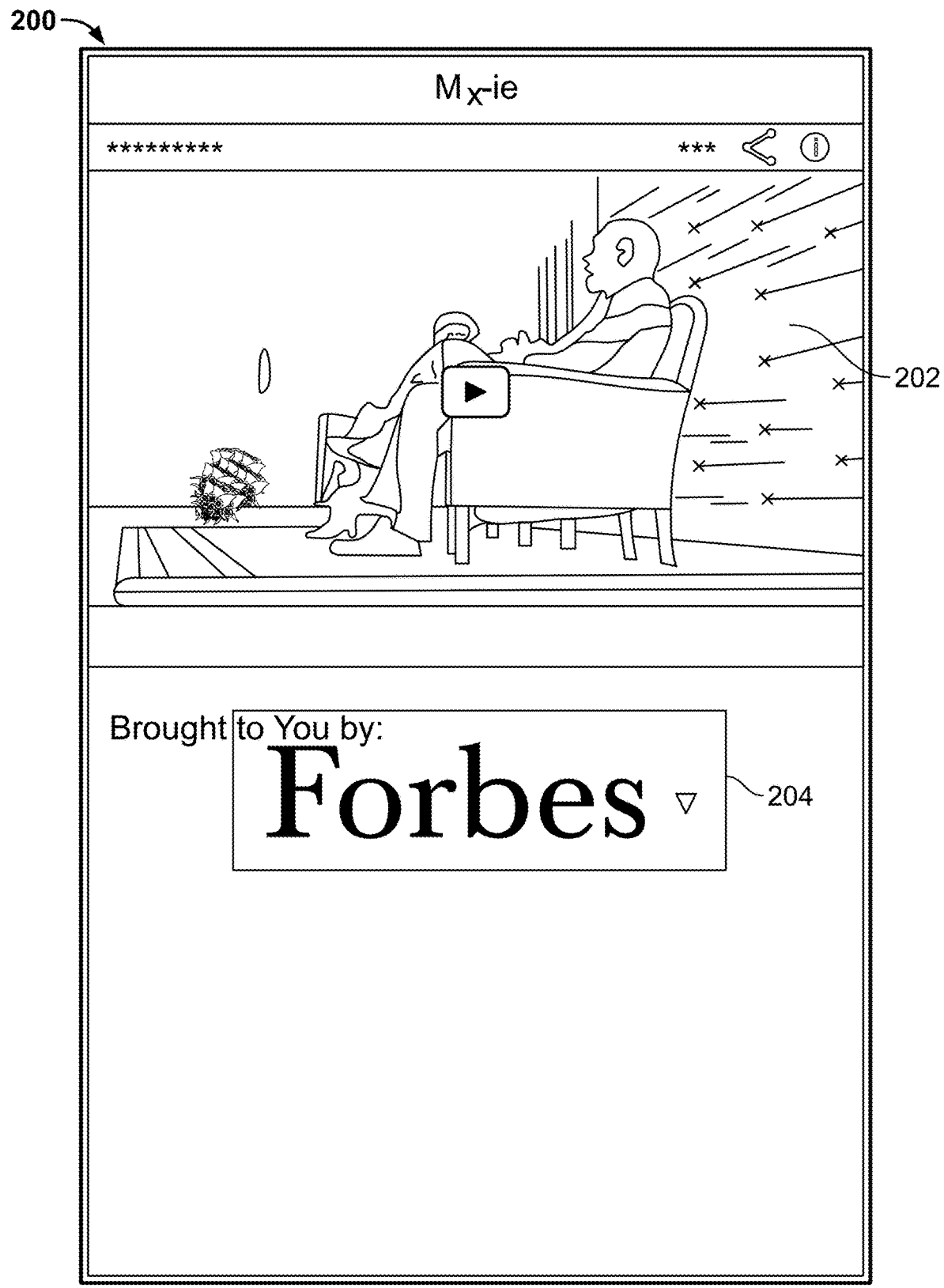
FIG. 2 shows an example of a user interface for including a video and an advertisement in a post in accordance with some embodiments of the disclosed subject matter.

In accordance with some embodiments, advertising content can be provided in one or more elements of a post. For example, as shown in FIG. 2, a post 200 can include a video 202 and an advertisement 204. Additionally or alternatively to providing advertising content in a separate element from other, non-advertising content of a post, advertising content and non-advertising content can be presented in the same element by presenting the advertising content before, during, and/or after the presentation of the non-advertising content, in some embodiments. More particularly, for example, when presented before or after non-advertising content, the advertising content may be exclusively presented, whereas when presented during the presentation of the non-advertising content, the advertising content may be presented alongside the non-advertising content, over the non-advertising content (e.g., as an overlay), as a break in the non-advertising content (e.g., like a commercial break in a television program), etc.

In some embodiments, advertisements presented during a user's post may cause the advertiser to owe an advertising fee to the author. A player presenting the post or a server delivering the advertising content may automatically report the advertisement presentation to a server that tracks the presentation of advertisements so that the fees owed to the authors can be tracked, in some embodiments.

Figure 3:
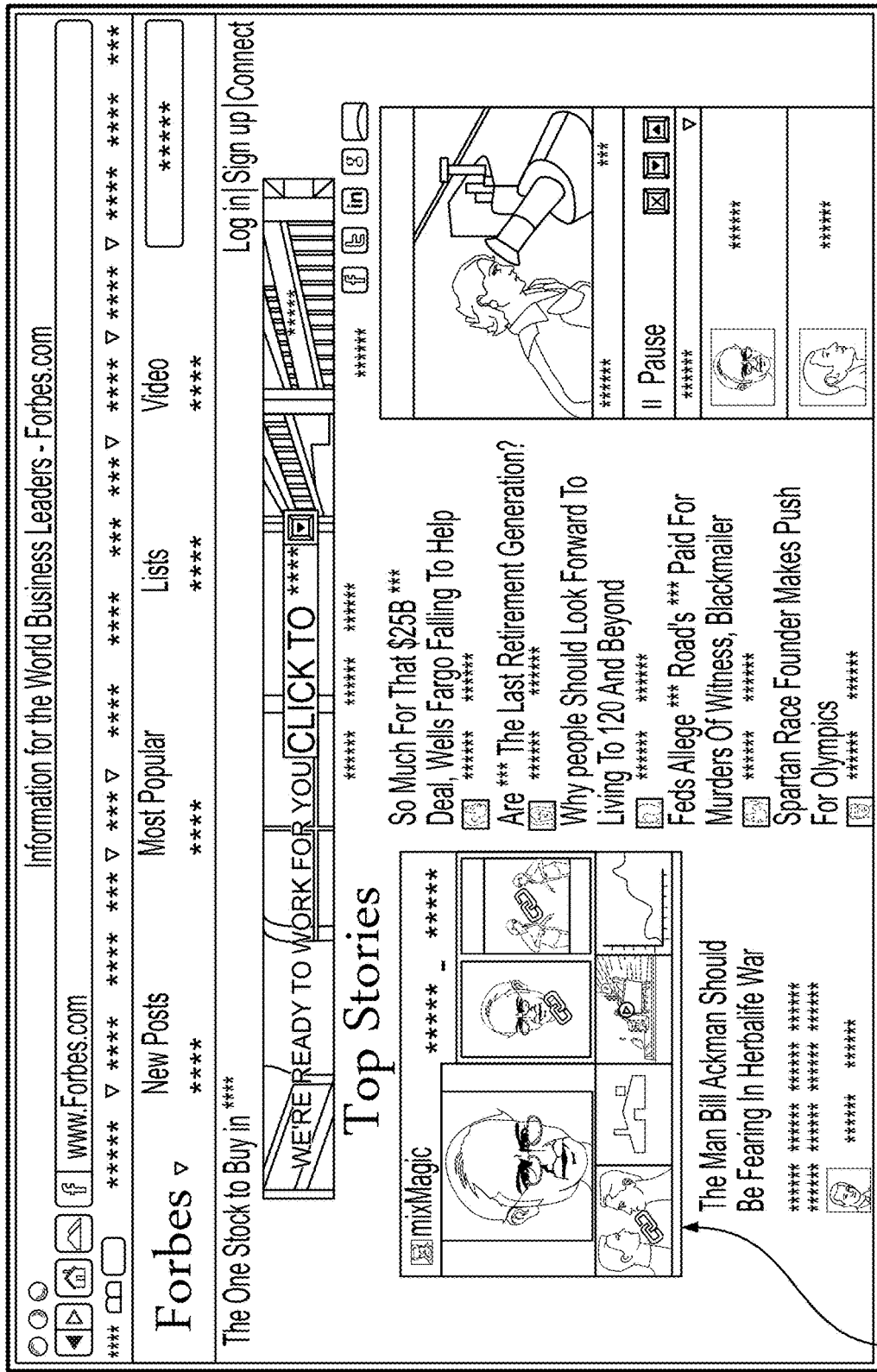
FIG. 3 shows an example of presenting a post in a Web page in accordance with some embodiments of the disclosed subject matter.

A post, or a portion of the post, can be presented in any suitable space capable of presenting the post in some embodiments. For example, in some embodiments, a post, such as post 302, can be presented in a Web page, such as Web page 300, as shown in FIG. 3.

Figure 4:
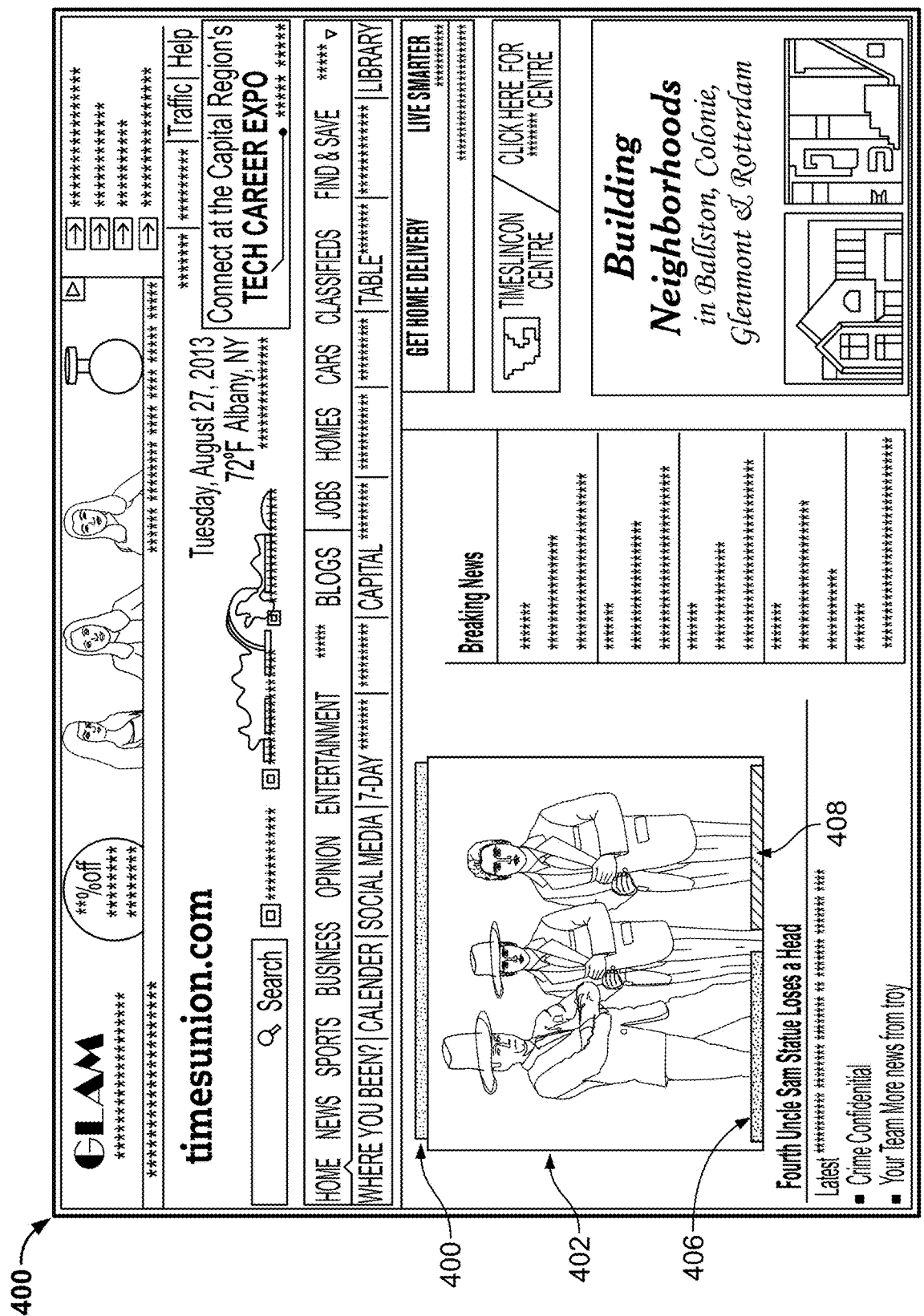
FIG. 4 shows an example of a user interface for presenting transparent indicators which indicate multiple elements within a post in accordance with some embodiments of the disclosed subject matter.

In some embodiments, the content of all elements of a post need not be visible at the same time. For example, as shown in FIG. 4, a post 402 on a Web site 400 can include semi-transparent visual "bars" 404, 406, and 408 (or any other suitable indicator, such as one or more overlay icons, border features, etc.) to indicate that the post has more than a single element, and that the content of the other element(s) can be presented in response to a user clicking on the bar (or other indicator).

In some embodiments, elements of a post can be presented and interacted with within a player, for example, in a Web browser. In some embodiments, the player can be opened (e.g., as a pop-up within a display) when an element in a post is selected. For example, a post may be presented as shown in FIG. 1A, and then when any element in the post is selected, the player can be presented in a pop-up on the display. In some embodiments, the player can allow the elements of a post to be presented as items in a gallery, sequenced gallery, carousel, grid, etc. A viewer of such a gallery, sequenced gallery, carousel, grid, etc. can step, swipe, pan, etc. through the items as they are presented. By swiping, pressing a right arrow (button or icon), panning, etc., a viewer can then view a next piece of content associated with a next element of the post for viewing. In some embodiments, the individual items of content corresponding to the different elements of the post can be associated with different file types.

Figure 5:
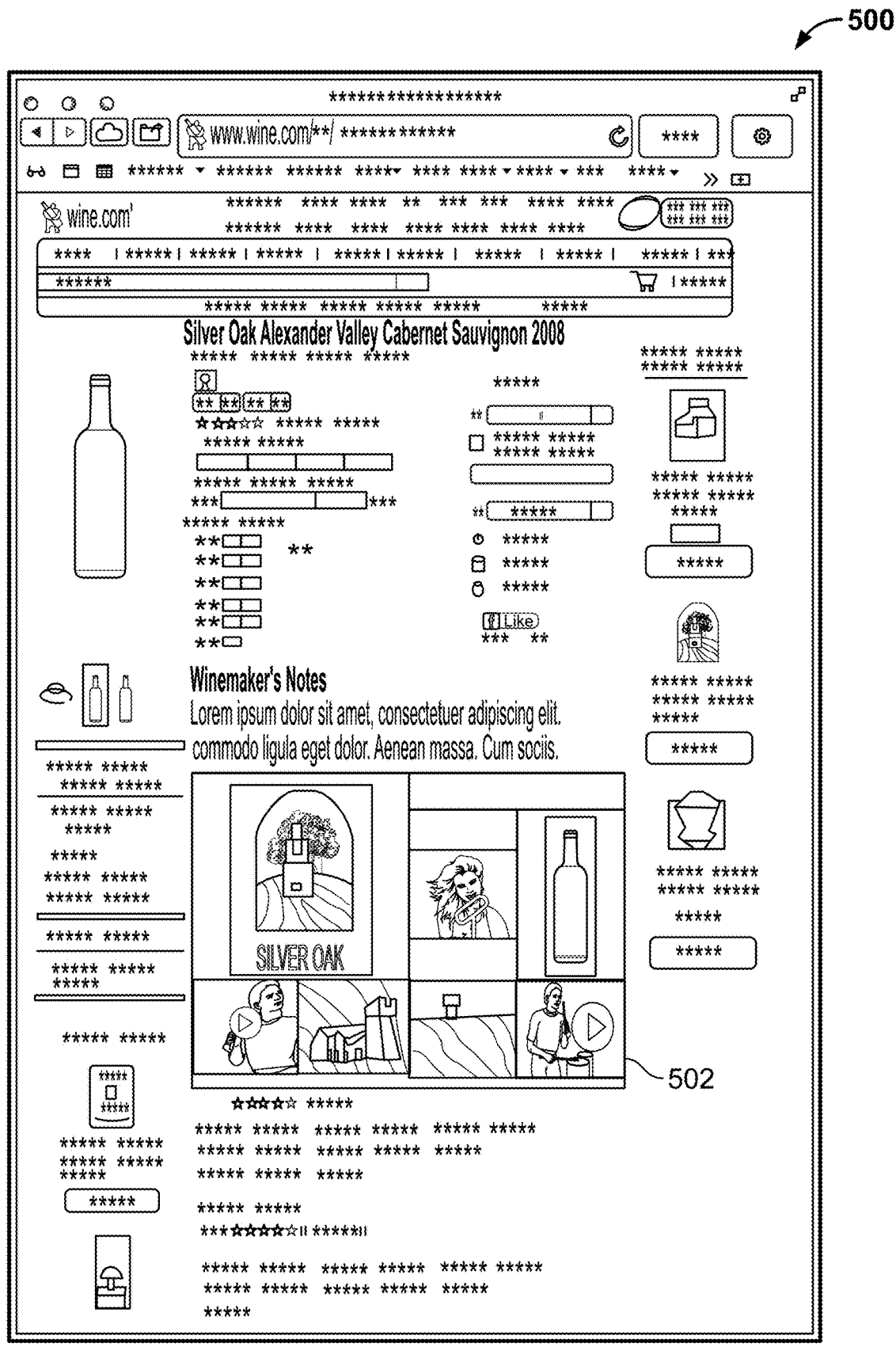
FIG. 5 shows an example of a user interface for allowing a retailer to create a post in accordance with some embodiments of the disclosed subject matter.

As mentioned above, in some embodiments, a post can be created by a company to advertise its products or services. For example, as shown in FIG. 5, a post 502 can be created by a wine maker, distributor, retailer, or third-party, so that the post can be included in a retailer's Web page 500. This post can have any suitable security characteristics so that the post cannot be altered by any party other than the wine maker (or those authorized by the wine maker), in some embodiments.

Figure 6:
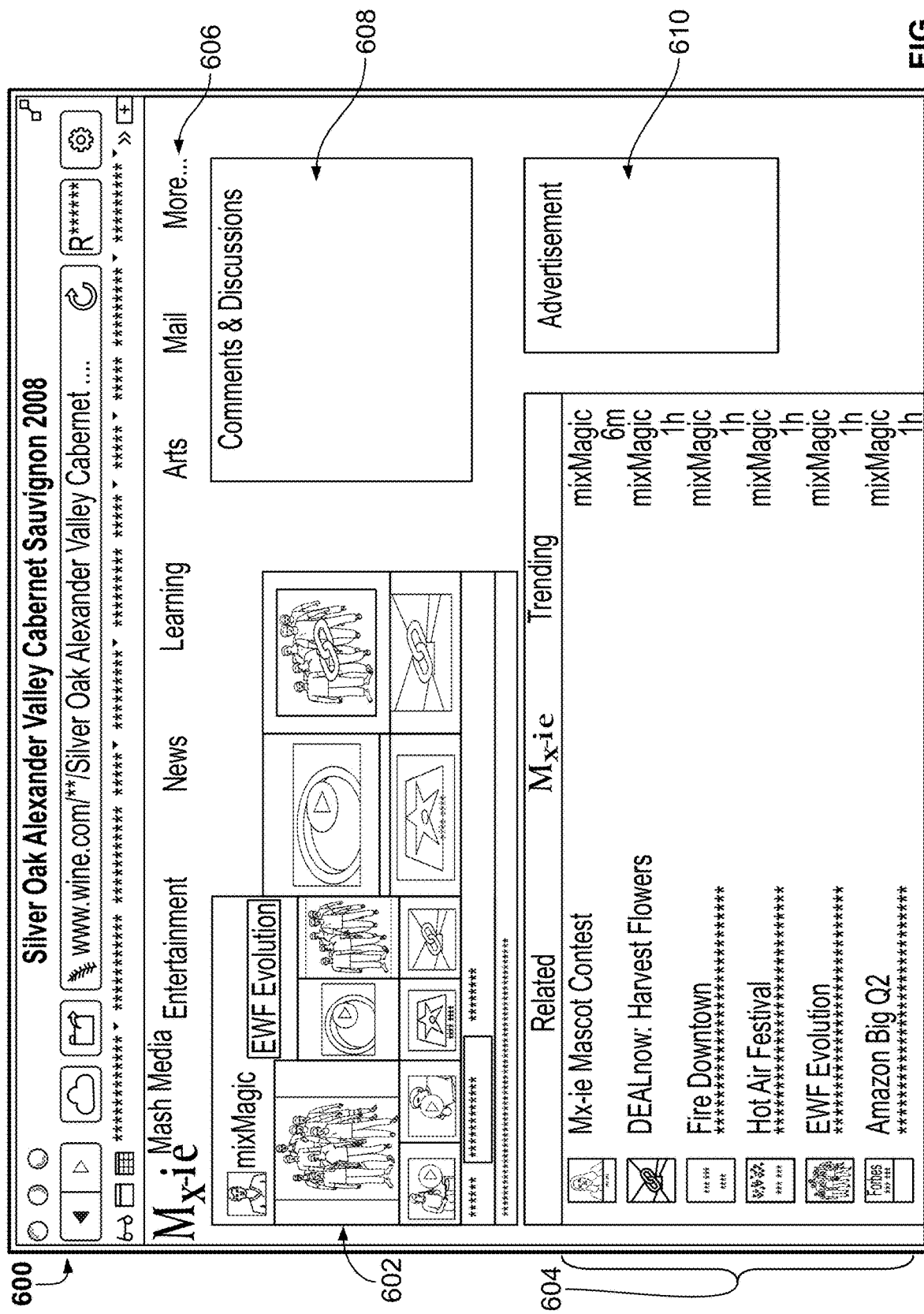
FIG. 6 shows an example of a user interface for presenting a post within a dedicated application in accordance with some embodiments of the disclosed subject matter.

In some embodiments, a post can be presented in a dedicated application or Web page. For example, as shown in FIG. 6, a post 602 can be presented in an application or Web page 600. Application or Web page 600 can also include a play list 604 of available posts to be presented (and this list may be filtered to only show related, trending, and/or any other class of post), one or more advertisements 610, one or more comment sections 608 for posting comments, one or more category selectors for selecting categories of posts, and/or any other suitable features, in some embodiments.

In some embodiments, a post can be presented with analytics corresponding to elements within the post. For example, as shown in FIG. 12, a post 1200 can be presented with indicators of the numbers of views corresponding to individual elements of post 1200 and/or with indicators of the numbers of views associated with different geographical locations.

As shown, post 1200 can include one or more elements (e.g., element 1202), which can be presented with a number of views indicator (e.g., number of views indicator 1204) in accordance with some embodiments. Number of views indicator 1204 can indicate a number of views associated with element 1202 over any suitable time period (e.g., a number of views within the last hour, a number of views within the last day, and/or any other suitable time period) and/or a total number of views. Additionally or alternatively, in some embodiments, number of views indicator 1204 can represent a number of views filtered with any other suitable criteria (e.g., a number of views originating from a particular geographic location, a number of views originating from a particular device, a number of views originating from users within a particular demographic group, and/or any other suitable criteria). Note that, in some embodiments, some elements within a post can be presented without an associated number of views indicator, as shown in FIG. 12.

In some embodiments, post 1200 can include a map 1206, which can be used to present one or more number of views indicators corresponding to one or more locations of map 1206. Map 1206 can represent a geographic region of any suitable size (e.g., a state, a country, a continent, a hemisphere, and/or any suitable combination of geographic regions). Furthermore, in some embodiments, the scope of the geographic region can be adjusted to present a larger or smaller region, for example, by zooming in or zooming out within map 1206.

Figure 12:
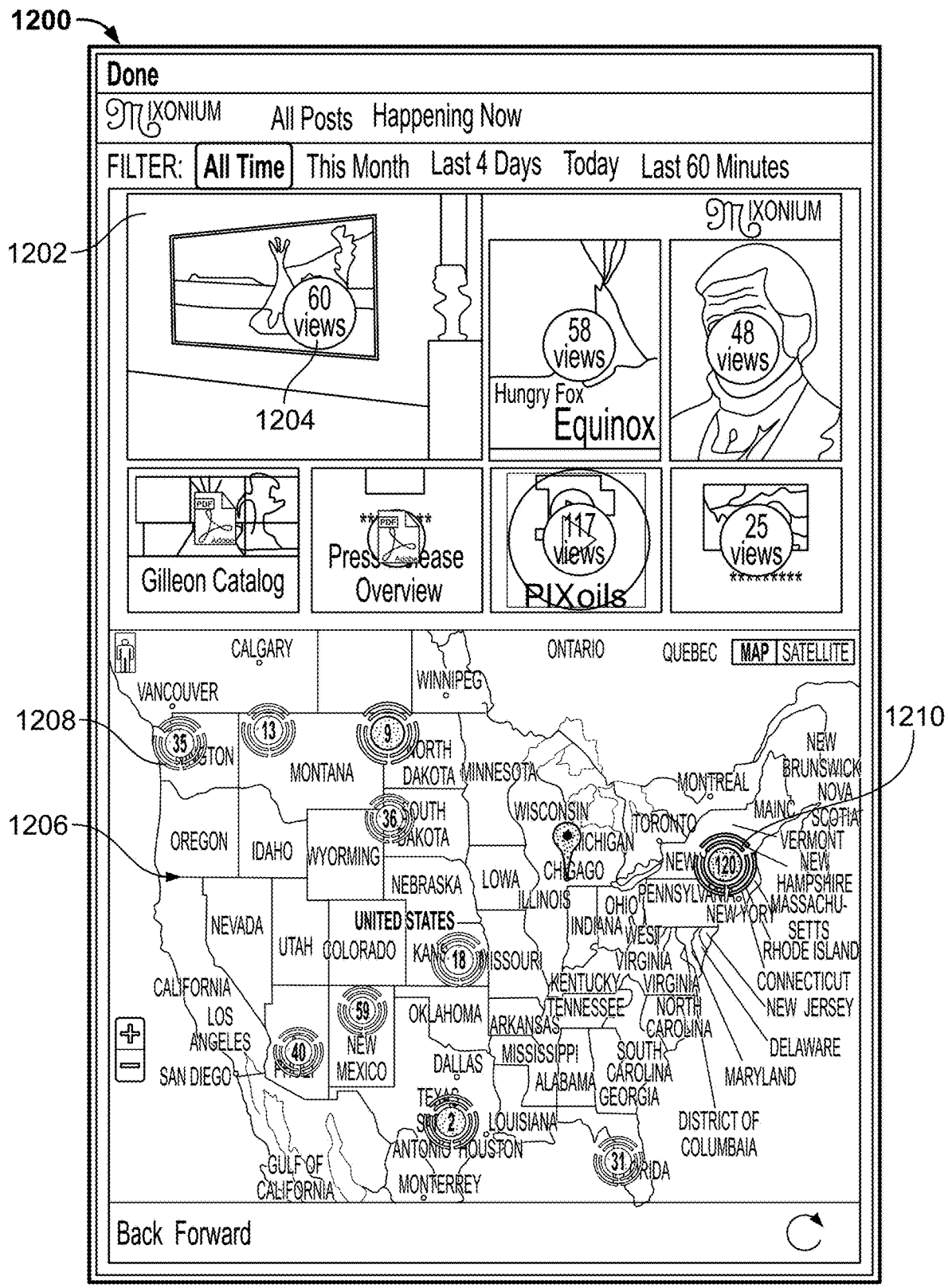
FIG. 12 shows an example of a user interface for presenting analytics associated with a post in accordance with some embodiments of the disclosed subject matter.

As shown in FIG. 12, map 1206 can include number of views indicators 1208 and 1210, which can indicate numbers of views associated with the geographic locations at which the indicator is presented. For example, as shown in FIG. 12, number of views indicator 1208 can represent a number of views associated with Washington state. The number of views associated with a particular geographic location can be determined using any suitable technique or combination of techniques. For example, in some embodiments, a geographic location associated with a particular view and/or impression of a post and/or of an element can be determined based on an Internet Protocol (IP) address from which the view originated, and views from the determined geographic location can be tallied over any suitable time period.

Number of views indicators 1208 and 1210 can have any suitable appearance. For example, in some embodiments, a color of an indicator can be associated with a magnitude of a number of views. As a more particular example, as shown in FIG. 12, number of views indicator 1210 can be presented in a different manner (e.g., a different color, a different size, and/or any other suitable difference) relative to the other indicators on map 1206 to indicate that the location(s) associated with number of views indicator 1210 produced a larger number of views relative to other locations. Note that the number of views associated with indicators 1208 and/or 1210 can be determined based on any suitable criteria. For example, in some embodiments, the number of views can represent a number of views of a particular element contained in post 1200. As another example, in some embodiments, the number of views can represent a number of views summed over all of the elements of post 1200. As yet another example, in some embodiments, the number of views can represent a number of views of a particular element and/or all of the elements over a particular time period.

Although not shown in FIG. 12, in some embodiments, analytic information can be presented with respect to time. For example, in some embodiments, an indication of a number of views associated with a post and/or a compartment can be presented in a graph showing the number of views as a function of time. In some embodiments, information indicating the number of views can be filtered based on both times associated with the views as well as geographic information associated with the views. For example, in some embodiments, a graph indicating views originating from a particular location as a function of time can be presented.

Note that, in some embodiments, presentation of post 1200, which contains analytics corresponding to a post and/or elements within the post, can be restricted to one or more particular users. For example, in some embodiments, viewing analytics can require entry of a password.

In some embodiments, content from one or more posts can be caused to be presented in a predetermined order. For example, the content from the elements of a single post can be caused to be presented in a given order. As another example, the content of multiple posts can be caused to be presented in a given order.

Figure 7:
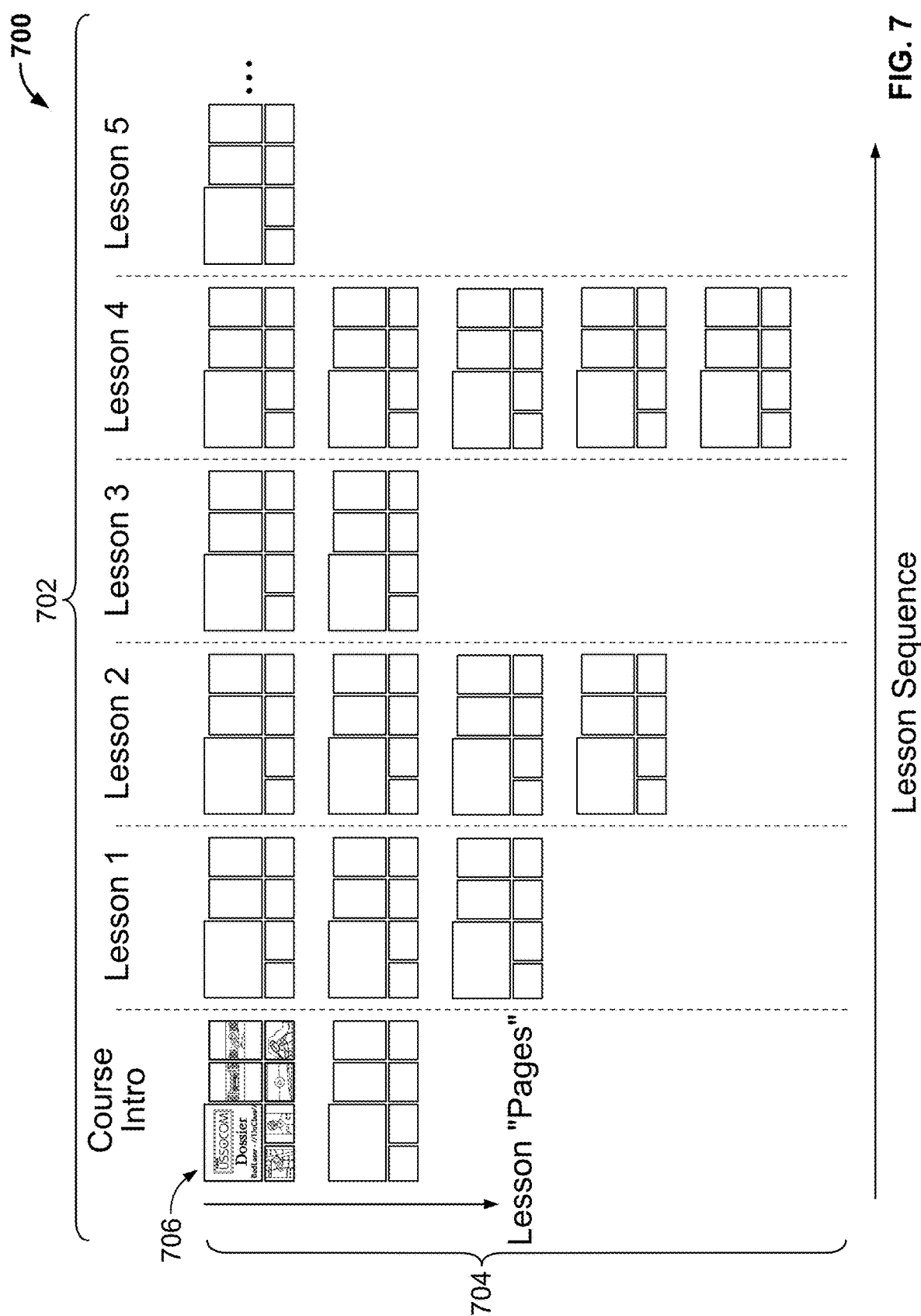
FIG. 7 shows an example of a user interface for presenting an order of a sequence of posts and for receiving user input indicating a re-ordering of the sequence of posts in accordance with some embodiments of the disclosed subject matter.

Any suitable mechanism can be provided in some embodiments for specifying the order in which content from the elements of a post, or from multiple posts, is to be presented. For example, as shown in FIG. 7, a user interface 700 can be presented for showing the order of presentation of a series of posts (represented by post icons 706) for an educational course. As shown in this example, a course can be made up of an introduction and multiple lessons 702. Within the introduction and each lesson of this example there can be one or more lesson pages 704, each represented by a post icon 706. In some embodiments, a user can re-order the posts in the course by dragging the post icons 706 to a new position and dropping them at a desired location.

In some embodiments, such an interface can present the posts in a dynamic visual carousel, or cover-flow, or other visual portrayal of one or more sequences of posts.

In some embodiments, such an interface can additionally or alternatively be used to graphically represent a syllabus for a course.

An interface like that of FIG. 7 can be used for other purposes as well, in some embodiments. For example, such an interface can be used to represent a table of contents for a book, "chapters" or segments of a movie, episodes of a television series, acts of a play, etc.

Figure 8:
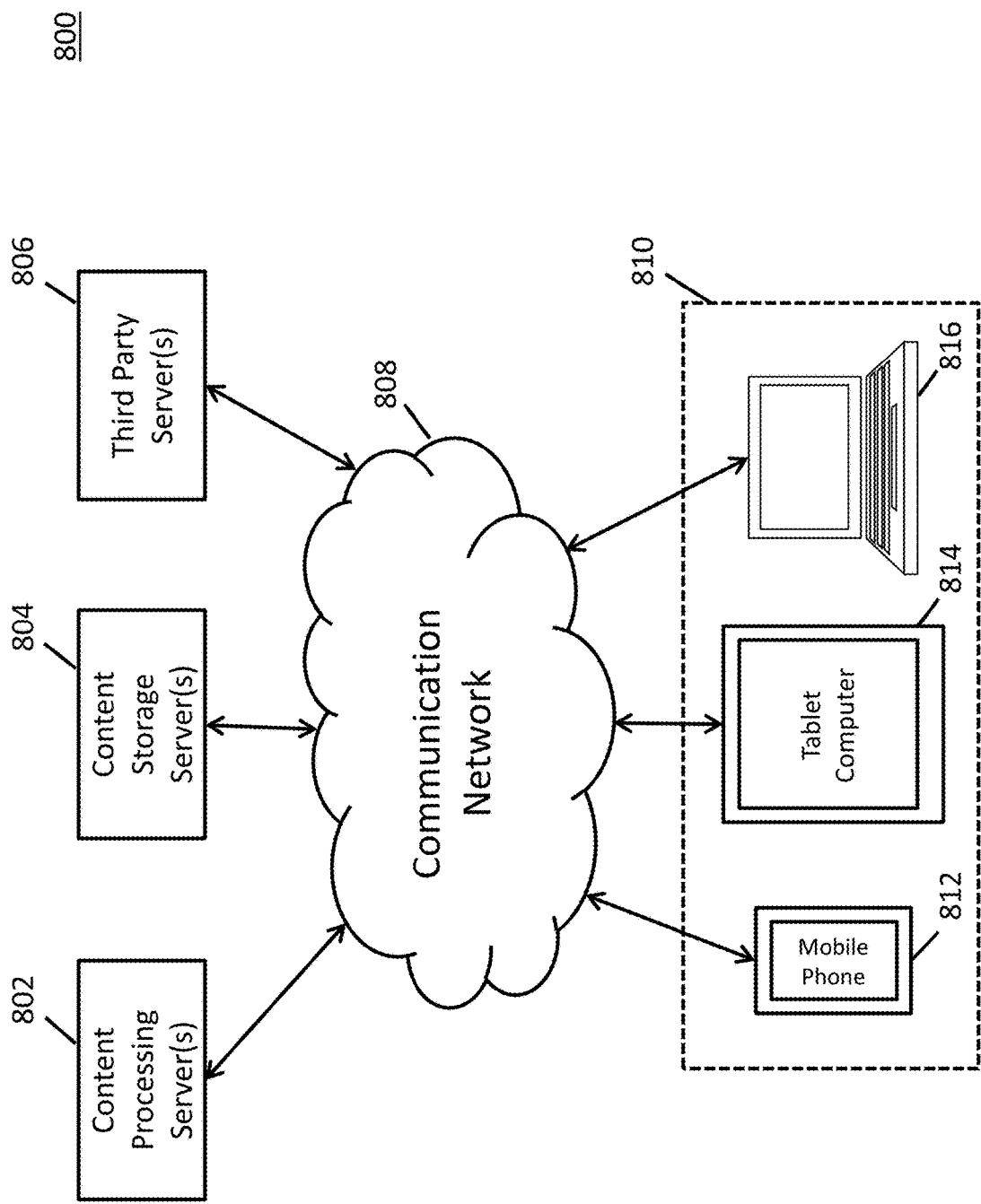
FIG. 8 shows a schematic diagram of an illustrative system suitable for implementation of mechanisms described herein for creating a layout of digital assets in accordance with some embodiments of the disclosed subject matter.

Turning to FIG. 8, an example 800 of hardware that can be used in accordance with some embodiments is shown. In some embodiments, hardware 800 can be used to present the user interfaces of FIGS. 1-7 and to receive user responses thereto, and to execute the processes of FIGS. 10, 11A, 11B, and 11C, as described further below.

As illustrated, the hardware can include one or more content processing servers 802, one or more content storage servers 804, one or more third party servers 806, a communication network 808, and one or more user devices 810, such as a mobile phone 812, a tablet computer 814, and/or a laptop computer 816, in some embodiments.

Content processing server(s) 802 can be any suitable servers for processing content for use in connection with the posts, in some embodiments. For example, in some embodiments, content processing server(s) 802 can be any suitable servers capable of encoding content, transcoding content, converting content, compressing content, resizing content, ripping content, changing content resolution, cropping content, zooming content, panning content, re-coloring content, perform thumbnail creation on content, backing-up content, compressing content, and/or perform any other suitable processing on the content. In some embodiments, content processing server(s) can additionally provision a service-type asset, such as a 3D asset visualizer. In some embodiments, a service-type asset can be accessed via any suitable Application Programming Interface (API). In some embodiments, an API can provide an overlay image (e.g., a still image, and/or any other suitable image) for reference in an element. In some embodiments, content processing server(s) 802 can be omitted. In some embodiments, content can additionally or alternatively be processed by a hardware processor on user device 810.

Content storage server(s) 804 can be any suitable servers for storing content and for delivering the content to a user device 810 in some embodiments. For example, content storage server(s) 804 can be one or more servers that stream content to a user device 810 via communication network 808. Content provided by content storage server(s) 804 can be any suitable content such as video content, audio content, television programs, movies, cartoons, music, sound effects, audiobooks, streaming live content (e.g., a streaming radio show, a live concert, etc.), etc., in some embodiments. In some embodiments, content storage server(s) 804 can be omitted. In some embodiments, content can additionally or alternatively be stored and/or delivered from memory on user device 810.

Third-party server 806 can be any suitable server for storing content and/or services from a third party, such as an advertiser, a Web site, an API, etc., in some embodiments. These assets may be accessible by a user or a post for creation of the post or presentation of the post, in some embodiments.

Communication network 808 can be any suitable combination of one or more wired and/or wireless networks in some embodiments. For example, communication network 808 can include any one or more of the Internet, a mobile data network, a satellite network, a local area network, a wide area network, a telephone network, a cable television network, a WiFi network, a WiMax network, and/or any other suitable communication network.

User devices 810 can include any suitable one or more user devices for creating, sharing, presenting, copying, and/or performing any other suitable function with respect to a post, in some embodiments. For example, in some embodiments, user devices 810 can include mobile devices, such as a mobile phone 812, a tablet computer 814, a laptop computer 816, a vehicle (e.g., car, boat, airplane, etc.) entertainment system, a portable media player, etc. Although not shown in FIG. 8, as another example, in some embodiments, user devices 810 can include non-mobile devices, such as a desktop computer, a set-top box, a smart television, a streaming media player, a game console, etc.

Although content processing server(s) 802, content storage server(s) 804, third party server(s) 806 are illustrated as separate devices, these devices can be combined into one or more devices in some embodiments.

Although three user devices 812, 814, and 816 are shown in FIG. 8 to avoid over-complicating the figure, any suitable number (including none) of each of these devices, and any suitable types of these devices, can be used in some embodiments.

In some embodiments, a user of a user device, such as user devices 812, 814, and 816, can select that a presentation of content from an element of a post, or a presentation of the entire post, be presented on another of devices 812, 814, or 816, or another device not shown in FIG. 8 (e.g., such as a large television), so that the content or post can be viewed on a larger screen or a different screen and/or by my multiple people.

Figure 9:
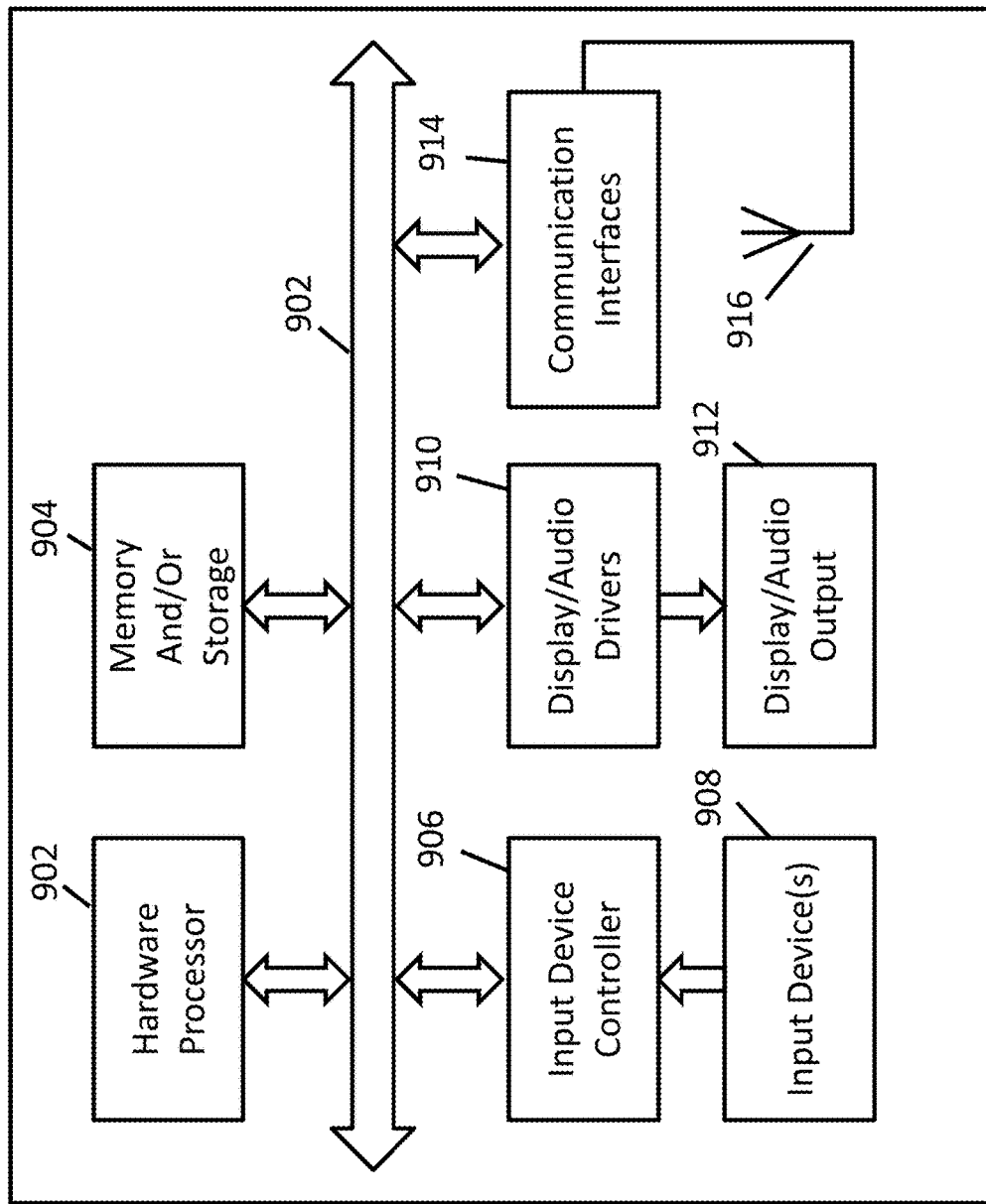
FIG. 9 shows a detailed example of hardware that can be used in a server and/or a user device of FIG. 8 in accordance with some embodiments of the disclosed subject matter.

Content processing server(s) 802, content storage server(s) 804, third party server(s) 806, and user devices 810 can be implemented using any suitable hardware in some embodiments. For example, in some embodiments, devices 802, 804, 806, and 810 can be implemented using any suitable general-purpose computer or special purpose computer. For example, mobile phone 812 may be implemented using a special purpose computer. Any such general-purpose computer or special purpose computer can include any suitable hardware, in some embodiments. For example, as illustrated in example hardware 900 of FIG. 9, such hardware can include a hardware processor 902, memory and/or storage 904, an input device controller 906, an input device 908, display/audio drivers 910, display and audio output circuitry 912, communication interface(s) 914, an antenna 916, and a bus 918.

Hardware processor 902 can include any suitable hardware processor, such as a microprocessor, a micro-controller, a digital signal processor, dedicated logic, and/or any other suitable circuitry for controlling the functioning of a general-purpose computer or a special purpose computer in some embodiments.

Memory and/or storage 904 can be any suitable memory and/or storage for storing programs, data, content, posts, post and/or element characteristics, etc. in some embodiments. For example, memory and/or storage 904 can include random access memory, read-only memory, flash memory, hard disk storage, optical media, etc.

Input device controller 906 can be any suitable circuitry for controlling and receiving input from one or more input devices 908 in some embodiments. For example, input device controller 906 can be circuitry for receiving input from a touch screen, from one or more buttons, from a voice recognition circuit, from a microphone, from a camera, from an optical sensor, from an accelerometer, from a temperature sensor, from a near field sensor, etc.

Display/audio drivers 910 can be any suitable circuitry for controlling and driving output to one or more display/audio output circuitries 912 in some embodiments. For example, display/audio drivers 910 can be circuitry for driving an LCD display, a speaker, an LED, etc.

Communication interface(s) 914 can be any suitable circuitry for interfacing with one or more communication networks, such as network 808 as shown in FIG. 8, in some embodiments. For example, interface(s) 914 can include network interface card circuitry, wireless communication circuitry, etc.

Antenna 916 can be any suitable one or more antennas for wirelessly communicating with a communication network in some embodiments. In some embodiments, antenna 916 can be omitted when not needed.

Bus 918 can be any suitable mechanism for communicating between two or more components 902, 904, 906, 910, and 914 in some embodiments.

Any other suitable components can be included in hardware 900, and any un-needed components of hardware 900 can be omitted, in accordance with some embodiments.

Figure 10:
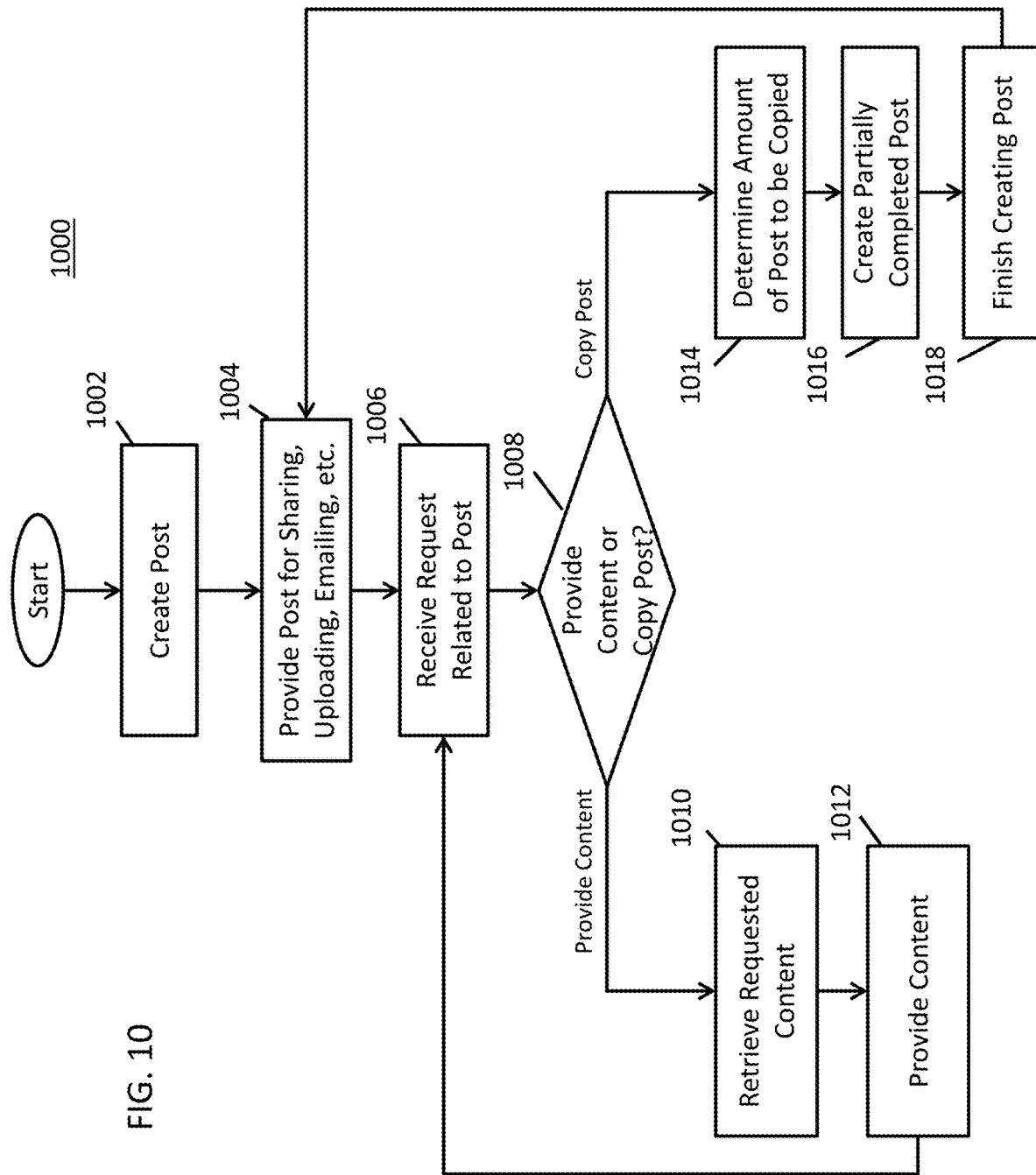
FIG. 10 shows an example of a process for creating a post, providing the post for sharing, and creating a new post containing at least part of the original post in response to a request in accordance with some embodiments of the disclosed subject matter.

Turning to FIG. 10, an example 1000 of a process for creating a post, providing the post for sharing, receiving a request related to the post, providing content for the post, and copying at least part of a post and creating a new post in accordance with some embodiments is shown. This process and process 1100 (described below in connection with FIGS. 11A, 11B, and 11C) can be performed by any suitable hardware, in some embodiments. For example, in some embodiments, this process can be performed by one or more hardware processors on one or more of a user device and/or a server as described herein.

As illustrated, at 1002, process 1000 can create a post. This post can be created in any suitable manner. For example, as described further below in connection with FIGS. 11A, 11B, and 11C, a process 1100 can be used to create the post as part of 1002.

Next, at 1004, process 1000 can provide the post for sharing, uploading, emailing, etc. In accordance with some embodiments, the post can be provided to and/or shared with any suitable device, application, program, storage, communication channels, etc. Providing a post for sharing can include transferring the post (or a post identifier) between applications on a user device and/or a server, transmitting the post (or a post identifier) over a communication network via a communication interface, etc., in some embodiments. In some embodiments, the post identifier can include a representation of the post as a single image. Furthermore, in some embodiments, the single image representing the post can be associated with a URL such that, in response to determining that the URL has been selected, the post represented by the single image can be presented (e.g., by redirecting a browser to a page hosting the post, by opening a new window containing the post, and/or in any other suitable manner).

In some embodiments, in order to facilitate sharing of a post, the post can be represented by thumbnail images combined with underlying links. For example, such a post can be represented using java script and/or hyper-text markup language (HTML). In this way, a post will likely be presentable on any java script and/or HTML compatible platform, such as a Web browser. For example, in some embodiments, when a user clicks on a thumbnail in an element of the post, the link underlying that thumbnail image can cause the content for that element to be retrieved and presented to the user.

At 1006, process 1000 can next receive a request related to the post. Any suitable requests can be received, in some embodiments. For example, in some embodiments, the request can be a request generated in response to a user clicking on a thumbnail image in a shared post and thereby following the underlying link. As another example, in some embodiments, the request can be a request to copy the post.

Process can determine at 1008 whether the request is to provide content or copy the post. If the request is a request to provide content for the post, process 1000 can branch to 1010 and retrieve the requested content. This content can be retrieved in any suitable manner and from any suitable location, in some embodiments. For example, in some embodiments, this content can be retrieved from storage on a content storage server such as content storage server 804 of FIG. 8. Next, process 1000 can provide the content in response to the request at 1012. The content can be provided in any suitable manner, in some embodiments. For example, in some embodiments, the content can be provided as part of a Web page that is provided to the requesting process. Step 1012 may include the option for the user to "dismiss," or remove the content from view, thus returning to an overall post view, in some embodiments. Process 1000 can then loop back to 1006.

If it is determined at 1008 that the request is a request to copy the post, at 1014, process 1000 can determine the amount of a post to be copied. This determination can be made in any suitable manner, in some embodiments. For example, after a user indicates that the user wants to copy a post (e.g., by selecting "copy" from a context menu while right-clicking on a post), a pop-up menu can be presented asking the user if the user wants to copy the entire post, only a portion of the post, only the base form of the post, or some combination thereof. As another example, in instances in which a user indicates that the user wants to copy a post created by another user, process 1000 can determine which portions of the post, if any, the user has permission to copy (e.g., by verifying permissions associated with the post to be copied, and/or using any other suitable technique). Next, at 1016, process 1000 can create a partially completed post (or a fully completed post if it is determined that the entire post is to be copied). This can be performed in any suitable manner, in some embodiments. For example, process 1000 can receive selections of portions of the post to be copied and replicate those portions in a new post. After the partially completed post has been created, process 1000 can finish creating the post and then loop back to 1004. The process can finish creating the post in any suitable manner, in some embodiments. For example, the process can finish creating the post by branching to 1128 of FIG. 11B (which is described further below).

In some embodiments, when creating a copy of a post, process 1000 may skip copying the content for the elements of the post being copied and instead provide links to that content. In this way, duplicate copies of content need not be made.

In some embodiments, the characteristics for a post created from a copy can be assigned multiple layers of attribution. These layers can be used for sharing and affiliate recognition in some embodiments.

Figure 11A:
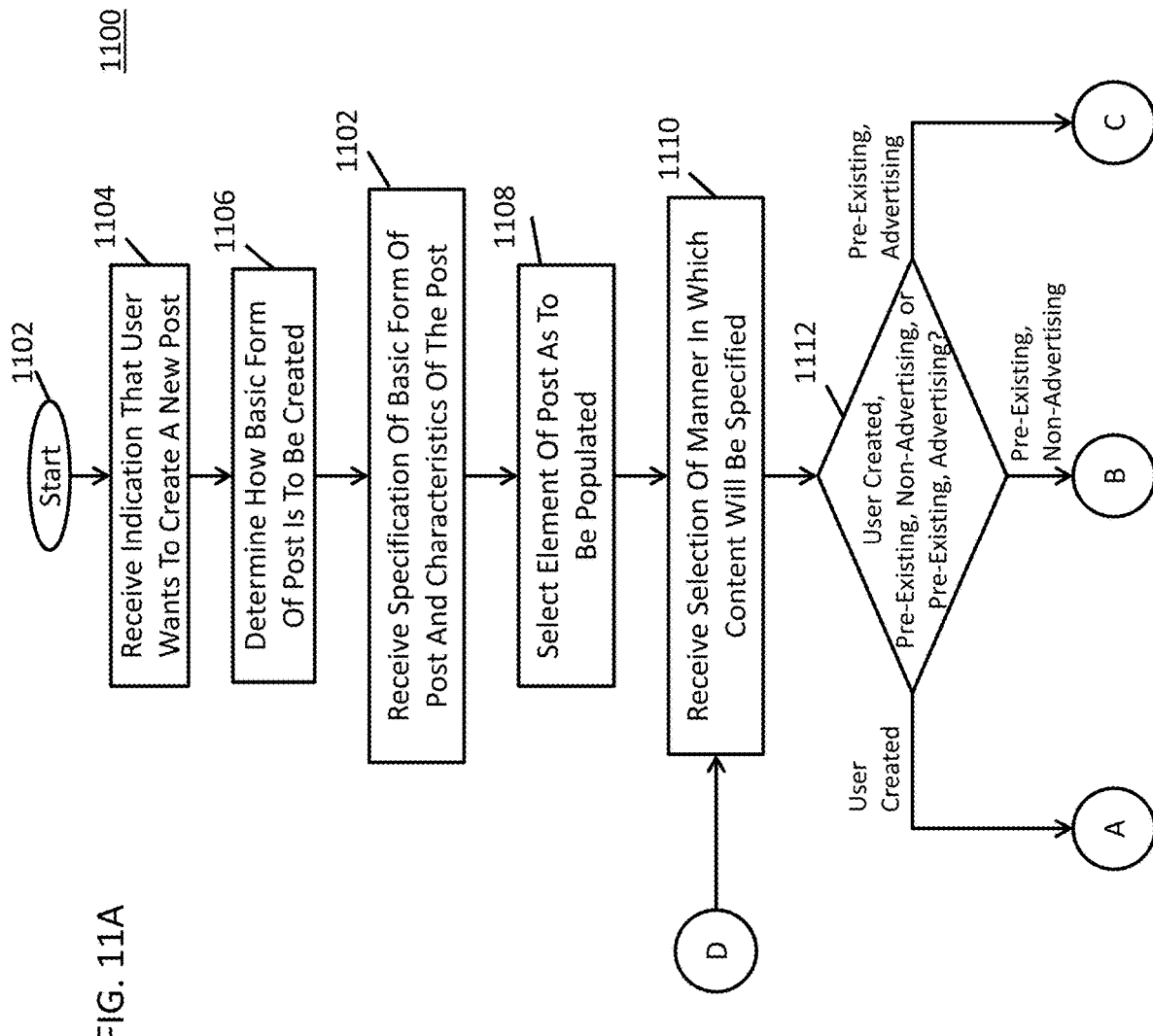
FIG. 11A shows an example of a process for creating a new post in accordance with some embodiments of the disclosed subject matter.

Turning to FIG. 11A, an example of a process 1100 for creating (or "authoring") a new post in accordance with some embodiments is illustrated. As shown, at 1102, process 1100 can receive an indication that a user wishes to create a new post. This indication can be received in any suitable manner from any suitable source, in some embodiments. For example, this indication can be received as a menu selection in an application on a user device.

Next, at 1104, process 1100 can optionally ask the user to specify how the basic form of the post is to be created. The basic form of the post can be created in any suitable manner, in some embodiments. For example, in some embodiments, the basic form of the post can be created from a template. As another example, in some embodiments, the basic form of the post can be created from a layout designed separately, or interactively by the user. Process 1100 can then receive at 1106 a user specification of the basic form of the post that is consistent with the user's specification of how the user wants to specify the basic form of the post, in some embodiments.

For example, when receiving a specification of the basic form of a post from a template from a user, process 1100 can receive a selection of the template from the user in any suitable manner. More particularly, for example, the process can receive the user's selection of a template from a menu of templates. This menu can organize templates into categories, subcategories, etc. As another more particular example, the process can receive the user's selection of a template from a set of icons showing an illustration of the basic form of the template.

As another example, when receiving a specification of the basic form of a post from a layout designed by a user, process 1100 can receive from the user information defining the layout using basic graphic elements such as squares, rectangles, triangles, circles, lines, 3D volumes, and/or any other suitable graphic elements. The process can enable the user to select such elements and arrange them in a design space on a display, in some embodiments. Then process 1100 can then allow the user to specify any suitable characteristics associated with different portions of the basic form as further defined herein—colors, visual effects, security, source information, etc., in some embodiments.

At 1106, process 1100 can also receive from the user characteristics of the post. Any suitable characteristics of the post can be received in some embodiments. For example, characteristics can include a topic of the post, an author of the post, security associated with the post, meta-tags or meta-information associated with the post, user group associations for the post, collection associations for the post, security levels for the post, business or enterprise preferences for the post, permissions indicating which elements of a post can be copied in a post created by another user, and/or any other suitable characteristics of the post.

After a user has specified the basic form of a post and characteristics of the post, an element of the post can be selected as to be populated with content at 1108. The element can be selected in any suitable manner, in some embodiments. For example, an element of the post can be selected based on the user clicking (or double-clicking, tapping, double-tapping, etc.) on the element in a display of the basic form of the post. As another example, an element of the post can be automatically selected based upon it being the first element of the basic form of the post that was created, based upon it being in a certain position in the post (e.g., top left), etc. Note that, in some embodiments, the element can be selected automatically (e.g., based on an algorithm). For example, in some embodiments, the algorithm can select an element randomly, can select an element corresponding to a particular area of the post (e.g., the top-most element, the left-most element, and/or any other particular area), and/or based on any other suitable criteria.

Then, at 1110, process 1100 can receive a selection of the manner in which content for the element of the post will be specified. This selection can be received in any suitable manner, in some embodiments. For example, in some embodiments, the selection can be received from a user selection of a pop-up menu, a context menu, etc. At 1112, process 1100 can then branch based on the user selection of the manner in which content for the element of the post will be specified.

Figure 11B:
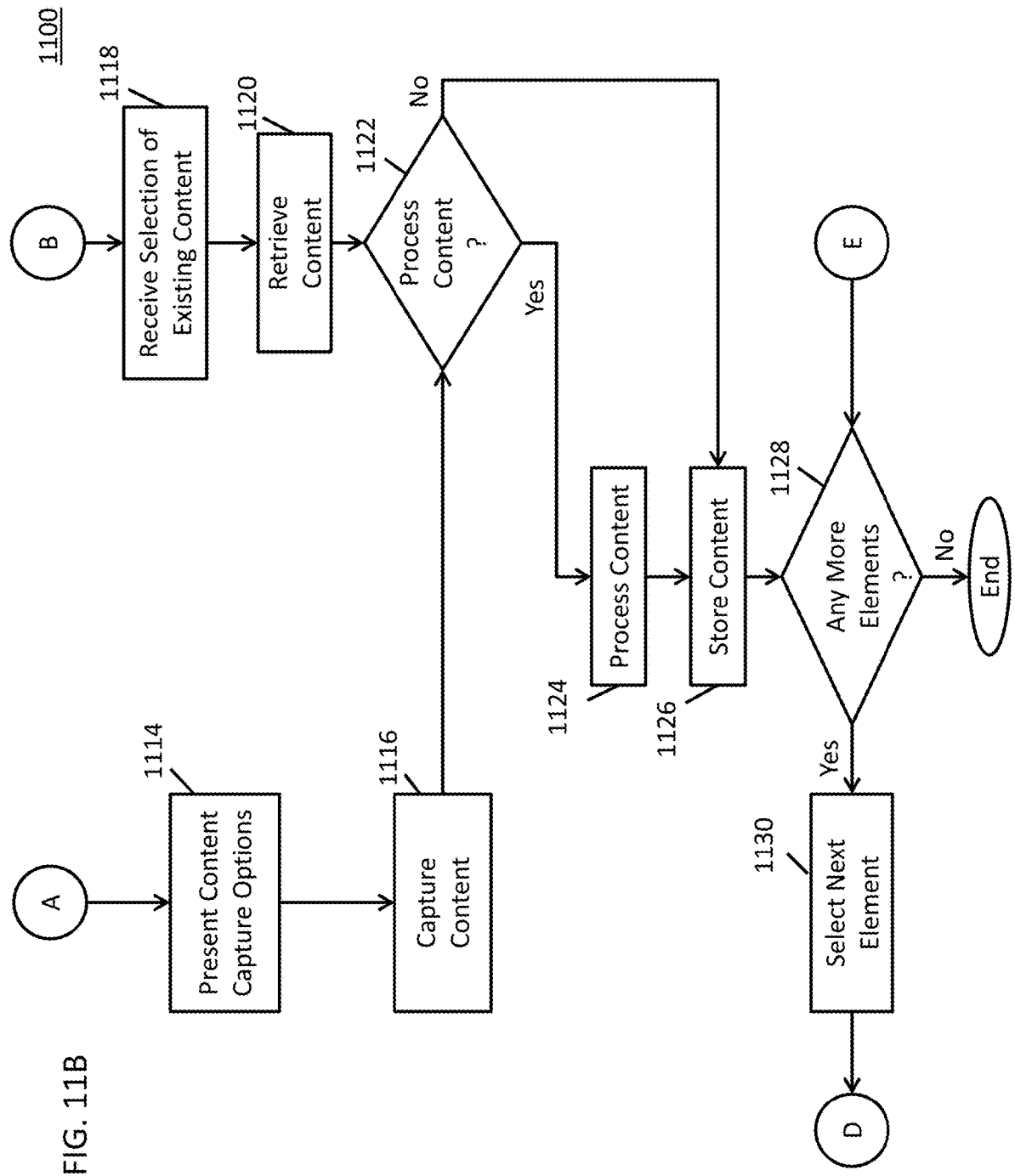
FIGS. 11B and 11C show examples of processes for receiving selections of user-created content and advertising content, respectively, to be included in a post in accordance with some embodiments of the disclosed subject matter.

For example, if process 1100 receives a selection that the content will be user-created, process 1100 can branch to A of FIG. 11B. As another example, if process 1100 receives a selection that the content will be selected from pre-existing, non-advertising content, process 1100 can branch to B of FIG. 11B. As yet another example, if process 1100 receives a selection that the content will be selected from pre-existing, advertising content, process 1100 can branch to C of FIG. 11C.

Turning to FIG. 11B, if process 1100 receives a selection that the content will be user-created, at 1114, the process can next present content capture options to the user and receive a selection of one of those options. Any suitable capture options can be presented, and these options can be presented and selected in any suitable manner, in some embodiments. For example, options to capture audio, video, images, gestures, handwriting, drawings, geo-location, etc. can be presented, and these options can be presented as icons in a pop-up menu. A user can then select one of these options by clicking or tapping on the option, in some embodiments.

Based on the option selected at 1114, process 1100 can next capture content at 1116. This content can be captured in any suitable manner using any suitable sensor (e.g., such as an image sensor, a video sensor, an audio sensor, a gesture sensor, a handwriting sensor, a drawing sensor, a location sensor, etc.), in some embodiments. In some embodiments, process 1100 may enable a user to preview captured content and indicate whether the content is suitable or desirable. In the event that a capture is unsuitable or undesirable to the user, process 1100 may enable new content to be captured and used instead, in some embodiments.

As mentioned above, if it is determined at 1112 that the content to be specified is pre-existing, non-advertising content, then process 1100 can receive a selection of such content at 1118. Process 1100 can receive a selection of existing content in any suitable manner, in some embodiments. For example, in some embodiments, the process can receive a selection of existing content at 1118 by presenting a mechanism for selecting existing content to the user and allowing the user to select content presented via that mechanism. Any suitable mechanism can be used in some embodiments. For example, in some embodiments, a user interface for selecting files (e.g., image files, video files, audio files, documents, and/or any other suitable files) on a user device can be provided. As a more particular example, in some embodiments, the user interface can allow for selection of files of any suitable type and associated with any suitable entity, such as Vimeo™ videos, Microsoft™ Office™ files (e.g., Word™, Excel™, Powerpoint™, and/or any other suitable file types), Apple™ iWork™ files (e.g., Pages™, Numbers™, Keynote™, and/or any other suitable file type), and/or any other suitable type of file. As another example, a Web browser can be provided for finding and selecting content available on the Internet or any other suitable communication network. Any suitable content available on the Internet or other suitable communication network can be selected in some embodiments. For example, content can be an entire Web page or a portion of a Web page (e.g., the portion can be one or more images, pieces of text, videos, pieces of audio, animations, characters, symbols, and/or any other suitable content on the Web page). As yet another example, content can be one or more files stored in any suitable storage on the Internet or other suitable communication network. As still another example, content can be one or more files and/or links to files from an online retailer, a social networking site, a search engine, and/or any other suitable Web site. As a more particular example, content can be a link to an iTunes U™ course, a link to a Dropbox™ file, and/or any other suitable link and/or API or file.

In some embodiments, the received selection of content can include interactive content and/or services. For example, in some embodiments, the content can include a link to a phone number and/or a link to an e-mail address, and selection of the link can cause the associated phone number to be called and/or an e-mail message addressed to the e-mail address to be created and/or opened. As another example, in some embodiments, the asset can include a service associated with an online meeting, such as Web conference, a video player streaming live video content, an interactive game session, a chat room, an instant messenger chat, an interactive writing and/or drawing pad, and/or any other suitable content associated with an online meeting. In some such embodiments, the content can include a link to the online meeting, and selection of the link can cause a window associated with the online meeting to be opened. As yet another example, in some embodiments, the content can include a recording of digital events, such as movement of a mouse, selection of menus, and/or any other suitable digital events. As still another example, in some embodiments, the content can include a script, which can be executed, for example, when the post containing the script is first displayed, when a compartment containing the script is interacted with, and/or at any other suitable time.

In some embodiments, to select an asset, process 1100 can receive the asset when it is determined that a user has dragged an icon associated with the asset into a post and/or a compartment in which the content is to be presented. The icon can be dragged in any suitable manner (e.g., by a mouse, by a finger on a touchscreen, and/or any other suitable technique). In some embodiments, any suitable technology can be used to associate the dragged icon and the post and/or compartment into which the icon is dragged (e.g., Object Linking and Embedding, or "OLE," and/or any other suitable technology). Upon receiving the dragged icon, the associated asset can be uploaded, transcoded, and processed (e.g., a thumbnail representing the content can be created, the content can be compressed, and/or any other suitable processing) in any suitable manner. In instances where a dragged icon represents a file and/or any other type of content that is stored in storage on a network, the Internet, or an intranet, a pointer to the content (e.g., a URL, and/or any other suitable type of pointer to the content) can be associated with the post and/or the compartment to which the icon was dragged.

In some embodiments, to select an asset, whether stored locally, on the Internet, or on any other suitable communication network, process 1100 may receive a user specified identifier of a topic, subject, date, time, source, Uniform Resource Locator (URL), search criteria, group or type associations, recent geo-location data, or other identifier of the content, in some embodiments. This identifier may be received in any suitable manner, such as from a menu, from direct input (e.g., using a keyboard, voice recognition, etc.), based on frequently selected identifiers, based on a topic of the post that has been previously specified (e.g., as in the case of a meta-tag), etc., in some embodiments. Based on the specified identifier, process 1100 may then automatically identify relevant content and present that content to the user, in some embodiments. For example, process 1100 may retrieve all images from a Web page corresponding to a URL selected by a user and present those images to the user for selection as content for the selected element of the post. As another example, in some embodiments, process 1100 can retrieve results from a search query based on the specified identifier and present the retrieved results to the user. In some such embodiments, a search engine API can be used to submit a query to and retrieve any suitable search results from any suitable search engine or search engine interface (e.g., Google™ Images, YouTube™ videos, and/or any other suitable search results).

In the case of a user selecting a URL or Web page for inclusion as a "Link" type element, the selecting may include analyzing the page for images, and presenting the user with those images so that the user may select one of the images for use as the link thumbnail, in some embodiments. Additionally, a user may be given the option to "capture" or screen-grab an image of the entire Web page, for use as the thumbnail for that element, in some embodiments.

In some embodiments, process 1100 can receive an asset automatically, that is, without user input. For example, in some embodiments, process 1100 can receive an asset when it is determined that a particular event has occurred. As a more particular example, in some embodiments, process 1100 can receive an asset when it is determined that an internal calendar and/or clock indicate a particular date and/or time. As another more particular example, in some embodiments, process 1100 can receive an asset when it is determined that an event specified on a calendar is occurring and/or has occurred. As a specific example, process 1100 can receive video content associated with a Web conference when it is determined that the Web conference is occurring and/or has ended.

Process 1100 can next retrieve the selected content at 1120. This process can be retrieved in any suitable manner, in some embodiments. For example, in some embodiments this process can be retrieved by downloading the asset from a suitable storage device (e.g., such as one or more of servers 804 and 806 of FIG. 8) on the Internet or any other suitable communication network.

With some assets, it may be necessary or desirable to perform processing on the asset to improve some aspect of the content, to improve the manner in which it is transmitted, to improve the manner in which it is displayed, and/or for any other suitable purpose, in some embodiments. For example, in some embodiment, process 1100 can encode, transcode, convert, compresses, resize, rip, change resolution, crop, zoom, pan, re-color, perform thumbnail creation, apply visual or audio effects, receive a pre-made thumbnail image, access an API service, and/or perform any other suitable processing on the asset. Such processing can be performed for any suitable effect in some embodiments. For example, in some embodiments, this processing can be performed such that it improves performance when the asset is transmitted over a communication network (e.g., due to file size, file format, etc.). As another example, in some embodiments, this processing can be performing such that it improves a presentation of the asset as part of the post (e.g., due to image/video size, image/video shape, image/video/audio resolution, image/video zoom, etc.). As a more particular example, in some embodiments, the processing can create a thumbnail of video or image content so that the thumbnail can be presented in the post. As yet another example, in some embodiments, the processing can include extracting a location associated with the content (e.g., a place associated with creation of the content, a place associated with upload of the content, and/or any other suitable location information). In such embodiments, location information can be stored in any suitable format (e.g., latitude and/or longitude information, time zone information, a name of a place, and/or any other suitable information). In some embodiments, the processing can be performed based on a user device on which the post and/or an element associated with the post is to be presented. For example, in some embodiments, dimensions of an image associated with the post can be resized based on a display size associated with the user device that is to present the image.

In the case of files being directly selected, either from a local storage location, or from a network or Web-based location, some embodiments can automatically detect the type of file selected, and process the content accordingly. For example, if the user selects an .mp3 audio file, then that content element can be processed with appropriate encoding, transcoding, etc. to facilitate subsequent presentation with thumbnail or overlay graphic in an element of a post. If the file selected is a .pdf, then other suitable processing can be applied. In some embodiments, a thumbnail or overlay graphic associated with the content can indicate the detected file type.

The processing of content may include commercial or transaction functionality, including representing an item or represented item as "for sale" providing one or more options for a user to add the item or the represented item to a virtual shopping cart for subsequent purchase, and providing an interface for the user to purchase the item or the represented item as in the case of retail or wholesale commerce, in some embodiments. For example, this processing may include the preparation of a file for digital rights management, as in the case of a song, or video, or movie, or eBook for sale, and it may optionally include the establishing of an affiliate identifier, so the author is paid a share of revenue or set fee, or other commission, if a viewer purchases the item. The affiliate identifier may then be used to track volume of sales, times of sales, conditions of sales, for purposes of commercial use, in some embodiments.

After the content has been retrieved at 1120 or captured at 1116, process 1100 can determine whether processing is to be performed on the content at 1122. The determination can be made on any suitable basis, criterion, etc. For example, the determination can be made based on whether the content can be properly presented in a post, or if the content will have commercial or transaction functionality within the post.

If it is determined at 1122 that the content is to be processed, process 1100 can perform any suitable processing (as described above) on the content at 1124. This processing can be performed on any suitable device. For example, in some embodiments, this processing can be performed on content processing server 802 and/or user device 810 of FIG. 8.

After performing the processing on the content at 1124, or after determining at 1122 that no processing is to be performed on the content, process 1100 can next store the content (whether processed or not) for subsequent use in a post at 1126. The content can be stored in any suitable manner and on any suitable one or more devices, in some embodiments. For example, in some embodiments, the content can be stored on a user device 810 of FIG. 8 for subsequent presentation on that device. As another example, in some embodiments, the content can be stored on one or more content storage servers 804 of FIG. 8 for subsequent streaming to one or more user devices. As yet another example, in some embodiments, a thumbnail that is generated at 1124 can be stored on a user device for display on that device, and the remainder (or some other part) of the content (whether processed or not) and/or the thumbnail can be stored one or more servers for storage. In some embodiments, the act of storing content on one or more of the user device and the server(s) may include storing the content locally (e.g., when process 1100 is being performed on the user device or server(s)) or causing another device to store the content (e.g., when process 1100 is not being performed on the user device or server(s)) by sending any suitable instructions or requests to the other device.

Process 1100 can then determine at 1128 whether there are any one or more elements of the post for which content needs to be selected. This determination can be made in any suitable manner, in some embodiments. For example, in some embodiments, this determination can be made by determining whether all user-defined content elements in a template for a basic form of the post have been specified.

If it is determined at 1128 that there are more elements, then process 1100 can select the next element at 1130 and then loop back to 1110. The selection made at 1130 can be made in any suitable manner, in some embodiments. For example, an element of the post can be selected based on the user clicking (or double-clicking, tapping, double-tapping, etc.) on the element in a display of the basic form of the post. As another example, an element of the post can be automatically selected based upon it being the next element of the basic form of the post that was created, based upon it being in a next position in a sequence of positions in the post (e.g., next to the right), etc.

As can be appreciated, a user may choose to select a variety of pieces, and types of pieces, of content to present in a post in some embodiments. For example, for a post related to the Missouri River, in one element of a post, a user may select (e.g., import) locally stored images taken from a trip to the river with the user's family. In another element of the post, the user may select a Web page from Wikipedia that has facts about the Missouri River. Any other suitable pieces of content can be presented in one or more other elements of the post.

Figure 11C:
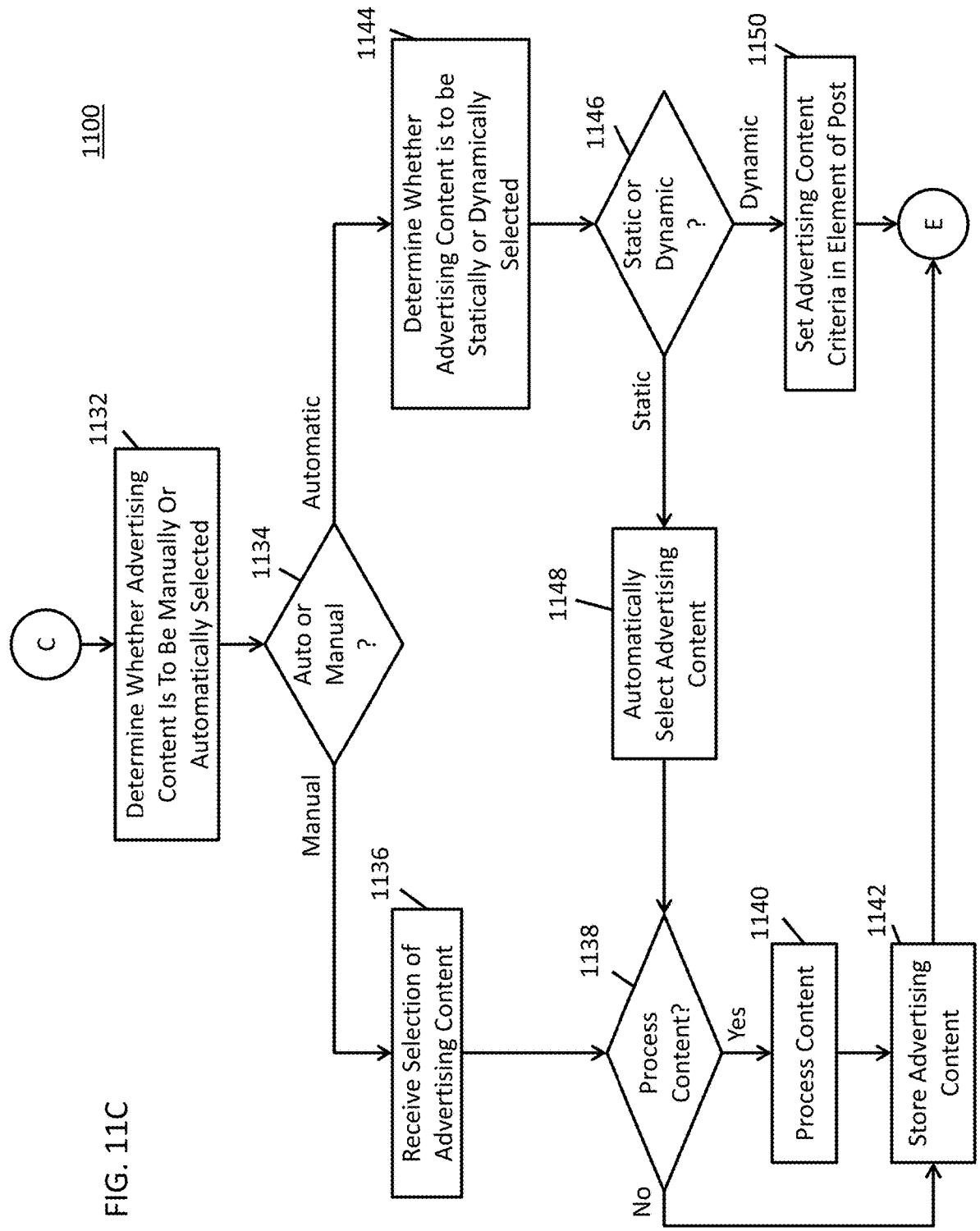

As stated above, if it is determined at 1112 that the content for an element of a post is going to be pre-existing, advertising content, process 1100 can proceed from 1112 of FIG. 11A to 1132 of FIG. 11C. As shown in FIG. 11C, at 1132, process 1100 can determine whether the pre-existing, advertising content is to be manually or automatically selected. This determination can be made in any suitable manner. For example, in some embodiments, this determination can be made by receiving a user selection of an automatic option or a manual option from a pop-up menu that is presented to the user. If it is determined that the pre-existing, advertising content will be selected manually, process 1100 can branch at 1134 to 1136. Otherwise, process 1100 can branch at 1134 to 1140.

At 1140, process 1100 can receive a user selection of advertising content. Process 1100 can receive this selection in any suitable manner, in some embodiments. For example, in some embodiments, the process can receive a selection of advertising content at 1140 by presenting a mechanism for selecting advertising existing content to the user and allowing the user to select advertising content presented via that mechanism. Any suitable mechanism can be used in some embodiments. For example, in some embodiments, a user interface for selecting advertising content files on a user device can be provided. As another example, a Web browser can be provided for finding and selecting advertising content available on the Internet or any other suitable communication network. Any suitable advertising content available on the Internet or other suitable communication network can be selected in some embodiments. For example, content can be one or more files stored in any suitable storage (such as server(s) 806 of FIG. 8) on the Internet or other suitable communication network. This advertising content can be created in any suitable manner, in some embodiments. For example, this advertising content can be created using known Internet advertisement methods.

With some advertising content, it may be necessary or desirable to perform processing on the advertising content to improve some aspect of the content, to improve the manner in which it is transmitted, to improve the manner in which it is displayed, and/or for any other suitable purpose, in some embodiments. For example, in some embodiment, process 1100 can encode, transcode, convert, compresses, resize, rip, change resolution, crop, zoom, pan, re-color, perform thumbnail creation, and/or perform any other suitable processing on the advertising content. Such processing can be performed for any suitable effect in some embodiments. For example, in some embodiments, this processing can be performed such that it improves performance when the content is transmitted over a communication network (e.g., due to file size, file format, etc.). As another example, in some embodiments, this processing can be performing such that it improves a presentation of the advertising content as part of the post (e.g., due to image/video size, image/video shape, image/video/audio resolution, image/video zoom, etc.). As a more particular example, in some embodiments, the processing can create a thumbnail of video or image advertising content so that the thumbnail can be presented in the post.

After the advertising asset has been selected at 1136, process 1100 can determine whether processing is to be performed on the content at 1138. The determination can be made on any suitable basis, criterion, etc., in some embodiments. For example, the determination can be made based on whether the advertising content can be properly presented in a post.

If it is determined at 1138 that the asset is to be processed, process 1100 can perform any suitable processing (as described above) on the content at 1140. For example, in some embodiments, this processing can be performed on content processing server 802 and/or user device 810 of FIG. 8.

After performing the processing on the asset at 1140, or after determining at 1138 that no processing is to be performed on the asset, process 1100 can next store the content (whether processed or not) for subsequent use in a post at 1142. The advertising asset can be stored in any suitable manner and on any suitable one or more devices, in some embodiments. For example, in some embodiments, the advertising content can be stored on a user device 810 of FIG. 8 for subsequent presentation on that device. As another example, in some embodiments, the advertising content can be stored on one or more content storage servers 804 of FIG. 8 for subsequent streaming to one or more user devices. As yet another example, in some embodiments, a thumbnail that is generated at 1140 can be stored on a user device for display on that device, and the remainder (or some other part) of the content (whether processed or not) and/or the thumbnail can be stored one or more servers for storage. The act of storing advertising content on one or more of the user device and the server(s) may include storing the content locally (e.g., when process 1100 is being performed on the user device or server(s)) or causing another device to store the content (e.g., when process 1100 is not being performed on the user device or server(s)) by sending any suitable instructions or requests to the other device, in some embodiments.

As stated above, if it is determined at 1132 that the pre-existing, advertising content is to be selected automatically, process 1100 can branch at 1134 to 1144 at which the process can determine whether the advertising content is to be statically or dynamically assigned. Statically assigned advertising content can be selected during the creation of a post and remain with the post until a user chooses to change the advertising content, and dynamically assigned advertising content can be automatically selected at the time of presentation based on any suitable advertising criteria, in some embodiments. The determination of whether the advertising content is to be statically or dynamically assigned can be made in any suitable manner, in some embodiments. For example, in some embodiments, this determination can be made by receiving a user selection of a static option or a dynamic option from a pop-up menu that is presented to the user.

If it is determined that the pre-existing, advertising content will be statically assigned, process 1100 can branch at 1146 to 1148 at which the process can automatically select the advertising content. This selection can be made in any suitable manner, in some embodiments. For example, this selection can be made based on meta-tags associated with a post, based on post or element characteristics, based on user-selected content in a post, based on an auction among advertisers for the space, etc. After the selection has been made at 1148, process 1100 can proceed to 1138 to determine whether to process the content, to 1140 to process the content based on the determination at 1138, and to 1142 to store the content, all as described above.

Otherwise, if it is determined that the pre-existing, advertising content will be dynamically assigned, process 1100 can branch at 1146 to 1150 at which the process can set advertising criteria for the element. Any suitable advertising criteria can be set in some embodiments. For example, the criteria can specify a topic of the advertisement, allowed companies for the advertisement, disallowed companies for the advertisement, minimum revenue that is to be given to the author of the post for presentation of the advertisement, a manner of selecting which advertisement will be dynamically selected for the advertisement (e.g., a presentation-time auction, a time period based selection, time-of-day based selection, geo-location based selection, user preferences based selection, etc.), and/or any other suitable criteria.

After storing the advertising content at 1142 or setting the advertising criteria at 1150, process 1100 can proceed to 1128 of FIG. 11B to determine whether there are any one or more elements for which content needs to be selected and to proceed accordingly as described above.

As can be appreciated, presenting advertising content along with user captured and/or pre-existing, non-advertising content can provide many advantages to both users and advertisers, in some embodiments. For example, if a user has a post about a wedding that the user attended, the user may select to include an automatically selected wedding-related advertisement to be included in an element of the post. This advertisement may be selected on any suitable basis, such as being based on meta-tag information associated with the post (e.g., that the bride wore a dress from a specific designer), and can contain any suitable advertising content (e.g., such as an image of an advertisement and a link to a wedding magazine in which the dress is described and/or a location at which the dress can be purchased), in some embodiments.

As another example, for a post relating to an entertainment event (e.g., such as a concert, a sporting event, a play, a musical, a circus, etc.), a user may include in elements of the post pictures, reviews, videos, audio, etc. A party involved with the presentation of the event (e.g., an artist, a promoter, a production company, etc.) may provide content that can be selected by the user as pre-existing, non-advertising content and/or as pre-existing, advertising content relating to future events or to products (e.g., memorabilia, DVDs, sound tracks, etc.) or services (e.g., subscriptions, fan clubs, etc.) related to the event that can be purchased, in some embodiments.

In some embodiments, once a post is created, or authored, the mechanisms can allow a user to change and/or modify a thumbnail representing content contained within an element of the post. For example, in some embodiments, the element can include a selectable input mechanism (e.g., a selectable icon, and/or any other suitable type of selectable input element), selection of which can cause a user interface that allows a user to specify an alternate thumbnail to be opened.

In some embodiments, once a post is created, or authored, the mechanisms may prepare the post for sharing on the Web. In this preparation, after a user elects to share the post, a process can automatically generate an HTML Web page that contains the post's "player" embedded in it, in some embodiments. That page may be accessible by only a secure URL link, in some embodiments. The user may also be prompted with an option to email a link to the page using an email application or client. For example, a real estate broker can authorize a post that describes a property, including a voice recording element that explains why the property is of particular interest to a potential purchaser. The broker can then "share" the post by emailing an automatically generated link to the potential purchaser. The potential purchaser can then click on the link in the email, and be presented with the post in a browser.

In some embodiments, the mechanisms may enable a user to elect to "share" the post by sending it to any one or more suitable social networks, such as Facebook™, Twitter™, or Pinterest™. In some such embodiments, a Web-based landing page for the post can be created, a thumbnail encapsulating the post can be auto-generated, and the thumbnail can be sent to a user-selected network. In some embodiments, the thumbnail can be associated with a Uniform Resource Locator associated with the Web-based landing page. When another user clicks on the thumbnail or the shared listing, the user can be presented with a Web page with the full post. In some embodiments, metadata related to a social networking service (e.g., a name of a social networking service, an icon associated with a social networking service, a link to a social networking service, a username corresponding to a social networking service for the creator of the post, and/or any other suitable information) can be associated with the post.

Figure 13:
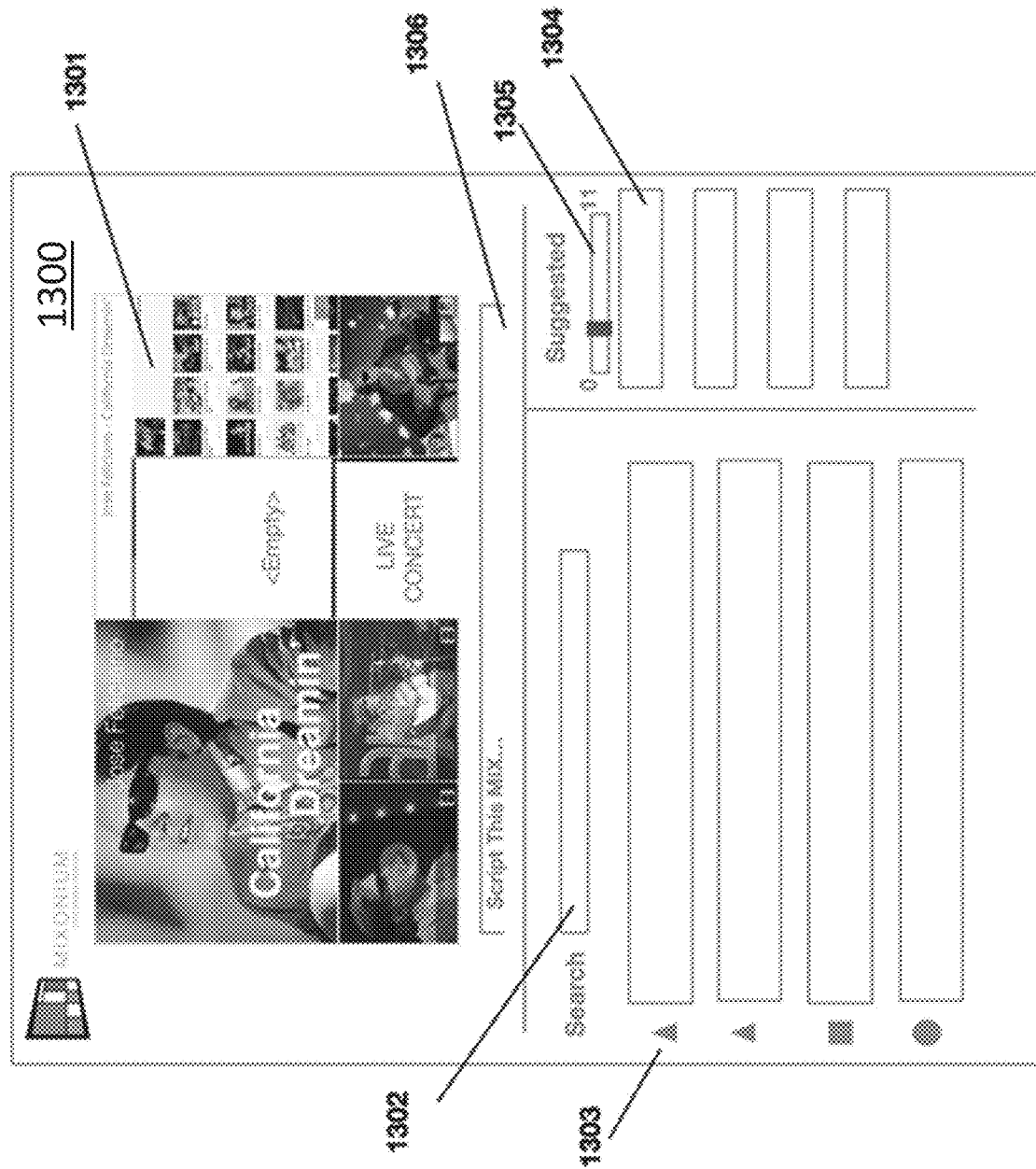
FIG. 13 shows an example of a user interface for presenting a layout as a mezzanine object in a browser in connection with search, scripting, and/or recommendation actions.

FIG. 13 shows an example 1300 of a user interface in which elements are positioned in connection with fields for performing various functions in accordance with some embodiments of the disclosed subject matter. As illustrated, in some embodiments, user interface 1300 can include an asset layout 1301, a search area 1302, a search workspace 1303, a secondary recommendation area 1304, a recommendation factor 1305, and/or a markup language field 1306.

In some embodiments, asset layout 1301 can be any suitable portion of user interface 1300 in which different assets can be moved, positioned, and/or interacted with.

In some embodiments, search area 1302 can include any suitable user interface control(s) for receiving a search query. In some embodiments, results of a search query entered in search area 1302 can cause results of the search query to be presented in search workspace 1303. In some embodiments, any suitable items corresponding to the search results presented in search workspace 1303 can be selected and/or dragged into portions of asset layout 1301. In some embodiments, each item associated with a search result that is presented in search workspace 1303 can include any suitable type of content (e.g., an image, a video, an animation, an icon, a document, a slideshow, an audio file, a playlist of media content, and/or any other suitable type of content) and/or an indication of or link to any suitable type of service (e.g., a phone number that can be called, an address that can be navigated to via any suitable navigation service, an indication of a transaction processing system, a link to a video conferencing meeting, and/or any other suitable type of indication of or link to a service). In some embodiments, a service can be implemented using any suitable application executing on a user device, such as an application for sending and receiving messages, an application for viewing media content (e.g., music, videos, and/or any other suitable type of media content), an application for navigation, an application for video conferencing, and/or any other suitable type of application. In some such embodiments, selection of an item corresponding to a service can cause a corresponding application to be initiated or launched on a user device. Note that, in some embodiments, items included in search workspace 1303 can be identified from any suitable location (e.g., local storage or memory of a device presenting user interface 1300, a private network, a virtual network, from a Web site, and/or from any other suitable location) or combination of locations. Additionally, note that, although asset layout 1301 is positioned above search area 1302 and search workspace 1303 in FIG. 13, in some embodiments, asset layout 1301, search area 1302, and/or search workspace 1303 can each be positioned at any suitable location within user interface 1300.

Additionally, note that, in some embodiments, each item presented in search workspace 1303 can be presented in connection with an indicator (e.g., an icon, an image, and/or any other suitable type of identifier) that indicates any suitable information related to the item. For example, as shown in FIG. 13, each item presented in search workspace 1303 can be presented in connection with an icon (e.g., a triangle, a square, a circle, and/or any other suitable type of icon). In some embodiments, the indicator can include any suitable type of information, such as a location of the item (e.g., that the item is stored in local memory, that the item is stored on a private network, that the item is stored on a virtual network, that the item is from a Web site, and/or any other suitable location information), a type of asset associated with the item (e.g., that the item is digital content, that the item corresponds to a service, and/or any other suitable type of asset), a type of content associated with a content item (e.g., that the item is a photo, that the item is a video, and/or any other suitable content type), and/or any other suitable information.

In some embodiments, secondary recommendation area 1304 can be any suitable search service that generates recommendations of items, content, or services based on assets selected from search workspace 1303. In some embodiments, secondary recommendation area 1304 can generate recommendations based on any suitable information, such as based on metadata associated with each of the selected assets from search workspace 1303. In some such embodiments, the metadata can indicate any suitable information, such as a type of content or a type of service associated with a selected asset, a name of a selected asset, an entity associated with a selected asset (e.g., a name of a creator of a content item, an entity associated with a selected service, and/or any other suitable entity), one or more keywords that indicate topics or genres associated with an asset, and/or any other suitable information. In some embodiments, secondary recommendation area 1304 can generate recommendations based on prior actions taken by a user viewing and/or using user interface 1300, such as prior posts generated by the user using a user account used to view user interface 1300, historical information of previous content viewed by the user, and/or any other suitable prior actions. Note that, in some embodiments, a user can explicitly indicate any suitable user preferences that can be used by secondary recommendation area 1304 to generate recommendations, such as an indication that particular types of content or services are not to be recommended, and/or any other suitable user preferences. Note that, in some embodiments, any asset retrieved by secondary recommendation area 1304 and presented as a suggestion can be selected and/or dragged for inclusion in asset layout 1301.

In some embodiments, recommendation factor 1305 can be any suitable user interface control(s) (e.g., a slider, a drop-down menu, a radio button, a checkbox, and/or any other suitable user interface control) that allows a user to select a similarity of assets recommended by secondary recommendation area 1304 to assets selected within search workspace 1303. For example, as shown in FIG. 13, recommendation factor 1305 is a slider that allows a user to select a value from any suitable range. In some embodiments, input of a relatively lower value can cause secondary recommendation area 1304 to identify assets that are relatively more similar to assets selected within search workspace 1303. Conversely, in some embodiments, input of a relatively higher value using recommendation factor 1305 can cause secondary recommendation area 1304 to identify assets that are relatively less similar to assets selected within search workspace 1303.

Note that, in some embodiments, similarity between two assets can be determined based on any suitable metric(s), such as based on metadata associated with each of the assets (e.g., a similarity of topics of the assets, a similarity of content type of each of the assets, and/or based on any other suitable metadata information). For example, in some embodiments, similarity between two assets can be determined by calculating a similarity metric that indicates a similarity of the two assets. Continuing with this example, in some embodiments, the similarity metric can be an average or a weighted average of similarity between the two assets across any suitable factors (e.g., a similarity of the two assets in topic, a similarity of the two assets in asset type or content type, a similarity of the two assets in creator of each asset, and/or any other suitable factors). As another example, in some embodiments, similarity between two assets can be determined using any suitable machine learning algorithm(s), such as using a trained classification algorithm that outputs a classification of whether the two assets or similar or dissimilar.

In some embodiments, markup language field 1306 can be used to allow a user to input any suitable commands that can be executed on asset layout 1301 using any suitable markup language or scripting language (e.g., Python, Angular.js, HTML, XML, and/or any other suitable markup language or scripting language) or a custom markup or scripting language that can be interpreted by a server associated with presentation of user interface 1300. In some embodiments, a command entered in markup language field 1306 can include any suitable reference to any suitable element included in asset layout 1301. In some embodiments, a particular element can be referenced in any suitable manner, such as by indicating an address or position of the element within asset layout 1301. In some embodiments, a command entered in markup language field 1306 can cause any suitable action to be performed on a corresponding element, such as changing a position of the element within asset layout 1301, changing a visual characteristic of the element within asset layout 1301 (e.g., changing a size, color, and/or orientation of the element, and/or any other suitable visual characteristic), and/or any other suitable action.

Note that, in some embodiments, any suitable artificial intelligence or machine learning techniques can be integrated with commands received via markup language field 1306. For example, in some embodiments, any suitable image or video processing technique(s) can be used to identify content of an image or video (e.g., recognition of a particular person, recognition of particular objects, and/or any other suitable content identification). As another example, in some embodiments, any suitable natural language processing techniques (e.g., using an API associated with IBM Watson™, and/or any other suitable natural language processing techniques) can be used for any suitable purpose, such as sentiment analysis, subject matter priority, and/or any other suitable purpose.

Additionally, note that, as described above in connection with FIGS. 11A, 11B, and/or 11C, asset layout 1301 can be stored in any suitable manner. For example, in some embodiments, asset layout 1301 can be stored as an image. As another example, in some embodiments, asset layout 1301 can be stored in connection with a URL such that asset layout 1301 can be shared with and/or accessed by other user devices using the URL. Note that, in some embodiments, in an instance in which asset layout 1301 is created using a first user device and in which asset layout 1301 is shared with a second user device, the second user device can view elements and/or interact with elements included in asset layout 1301 in any suitable manner. For example, in an instance in which an element included in asset layout 1301 corresponds to a particular service, the second user device can access the service by selecting the corresponding element.

Additionally, note that, in some embodiments, asset layout 1301 can be associated with a particular user account. In some embodiments, a layout, elements included in a layout, and/or assets included in a layout can be associated with a transactional cost. For example, in some embodiments, layout, elements, and/or assets can be associated with a viewing fee, and a user associated with the user account can be charged the viewing fee for viewing the layout, elements, and/or assets. As another example, in some embodiments, the user associated with the user account can be paid when other users view the layout, elements, and/or assets. In some embodiments, payment of fees can be implements in connection with the analytics shown in and described above in connection with FIG. 12. In some embodiments, transactions can be implemented using any suitable transaction systems or services, such as any suitable encrypted and distributed transactional system(s) (e.g., a blockchain, a distributed ledger, and/or any other suitable transactional system(s)). In some embodiments, a transactional system can be implemented on a server associated with the system described herein. Alternatively, in some embodiments, a transactional system or service can be accessed via a corresponding API.

In some embodiments, a method for creating a layout of digital content is provided, the method comprising: receiving at a hardware processor a selection of a base form for the layout of digital content; based on the selection of the base form, presenting using the hardware processor the layout of digital content on a display, wherein the layout of digital content includes a plurality of elements, each element corresponds to a region of the layout of digital content, and each element can be associated with a piece of digital content; receiving a selection of one of the plurality of elements; receiving a selection of a digital content type to be associated with the selection of the one of the plurality of elements; based on the selection of the digital content type and on a characteristic of the layout of digital content, presenting a plurality of pieces of digital content that can be associated with the selection of the one of the plurality of elements; receiving a selection of one of the plurality of pieces of digital content that can be associated with the selection of the one of the plurality of elements; retrieving the selection of the one of the plurality of pieces of digital content; converting the selection of the one of the plurality of pieces of digital content from a first form to a second form; storing the selection of the one of the plurality of pieces of digital content in the second form as stored content; and linking the stored content and the selection of the one of the plurality of elements such that when the selection of the one of the plurality of elements is selected for presentation, the stored content will be accessed.

In some embodiments, a system for creating a layout of digital content is provided, the system comprising: a hardware processor that is programmed to: receive a selection of a base form for the layout of digital content; based on the selection of the base form, present the layout of digital content on a display, wherein the layout of digital content includes a plurality of elements, each element corresponds to a region of the layout of digital content, and each element can be associated with a piece of digital content; receive a selection of one of the plurality of elements; receive a selection of a digital content type to be associated with the selection of the one of the plurality of elements; based on the selection of the digital content type and on a characteristic of the layout of digital content, present a plurality of pieces of digital content that can be associated with the selection of the one of the plurality of elements; receive a selection of one of the plurality of pieces of digital content that can be associated with the selection of the one of the plurality of elements; retrieve the selection of the one of the plurality of pieces of digital content; convert the selection of the one of the plurality of pieces of digital content from a first form to a second form; store the selection of the one of the plurality of pieces of digital content in the second form as stored content; and link the stored content and the selection of the one of the plurality of elements such that when the selection of the one of the plurality of elements is selected for presentation, the stored content will be accessed.

In some embodiments, non-transitory computer-readable media containing computer executable instructions that, when executed by a processor, cause the processor to perform a method for creating a layout of digital content are provided, the method comprising: receiving a selection of a base form for the layout of digital content; based on the selection of the base form, presenting the layout of digital content on a display, wherein the layout of digital content includes a plurality of elements, each element corresponds to a region of the layout of digital content, and each element can be associated with a piece of digital content; receiving a selection of one of the plurality of elements; receiving a selection of a digital content type to be associated with the selection of the one of the plurality of elements; based on the selection of the digital content type and on a characteristic of the layout of digital content, presenting a plurality of pieces of digital content that can be associated with the selection of the one of the plurality of elements; receiving a selection of one of the plurality of pieces of digital content that can be associated with the selection of the one of the plurality of elements; retrieving the selection of the one of the plurality of pieces of digital content; converting the selection of the one of the plurality of pieces of digital content from a first form to a second form; storing the selection of the one of the plurality of pieces of digital content in the second form as stored content; and linking the stored content and the selection of the one of the plurality of elements such that when the selection of the one of the plurality of elements is selected for presentation, the stored content will be accessed.

It should be understood that at least some of the above described blocks of the processes of FIGS. 10, 11A, 11B, and 11C can be executed or performed in any order or sequence not limited to the order and sequence shown and described in the figures. Also, some of the above blocks of the processes of FIGS. 10, 11A, 11B, and 11C can be executed or performed substantially simultaneously where appropriate or in parallel to reduce latency and processing times.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read-only memory (EPROM), electrically erasable programmable read-only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for creating a layout of digital assets, comprising:
receiving, at a hardware processor, a user selection of a base form for the layout of digital assets;
based on the user selection of the base form, presenting, using the hardware processor, the layout of digital assets in a layout portion of user interface presented on a display, wherein the layout of digital assets includes a plurality of elements, and wherein each element corresponds to a region of the layout of digital assets, and wherein each element can be associated with a digital asset;
receiving a selection of a digital asset from a group of available digital assets to be included in the layout of digital assets;
in response to receiving the selection of the digital asset, causing a representation of the digital asset to be presented in the layout of digital assets;
causing an image that represents the layout of digital assets to be created, wherein the image is associated with a Uniform Resource Locator (URL) that indicates a location of the image; and in response to determining that the URL has been selected on a user device, causing the image to be presented on the user device.

2. The method of claim 1, further comprising:
receiving a search query via a search input in a search region portion of the user interface;
causing a plurality of search results to be presented in the search region portion of the user interface, wherein each of the plurality of search results corresponds to a digital asset, and wherein each of the plurality of elements is selectable;
receiving a selection of one of the search results in the plurality of search results, wherein the selected digital asset corresponds to selected search result.

3. The method of claim 2, further comprising:
causing a second search portion of the user interface to be presented;
identifying a plurality of second search results based on the selected search result, wherein each of the plurality of second search results corresponds to a digital asset, and wherein each of the plurality of second search results is selected based on a similarity to the selected search result; and
causing the plurality of second search results to be presented in the second search portion of the user interface.

4. The method of claim 3, wherein the second search portion of the user interface includes an input for receiving an indication of a degree of similarity between each of the second search results and the selected search result.

5. The method of claim 4, further comprising performing the action on the referenced element by interpreting the command.

6. The method of claim 1, wherein the user interface includes a markup language field, wherein the markup language field receives a command that comprises a reference to an element in the plurality of elements included in the layout of digital assets and an action to be performed on the referenced element in the plurality of elements.

7. The method of claim 1, wherein the digital asset is a service associated with an application executing on the user device.

8. The method of claim 1, further comprising receiving a payment in connection with a user account of the user device in response to determining that the digital asset has been selected.

9. A system for creating a layout of digital assets, the system comprising:
a memory; and
a hardware processor that, when executing computer-executable instructions stored in the memory, is configured to:
receive a user selection of a base form for the layout of digital assets;
based on the user selection of the base form, present the layout of digital assets in a layout portion of user interface presented on a display, wherein the layout of digital assets includes a plurality of elements, and wherein each element corresponds to a region of the layout of digital assets, and wherein each element can be associated with a digital asset;
receive a selection of a digital asset from a group of available digital assets to be included in the layout of digital assets;
in response to receiving the selection of the digital asset, cause a representation of the digital asset to be presented in the layout of digital assets;
cause an image that represents the layout of digital assets to be created, wherein the image is associated with a Uniform Resource Locator (URL) that indicates a location of the image; and
in response to determining that the URL has been selected on a user device, cause the image to be presented on the user device.

10. The system of claim 9, wherein the hardware processor is further configured to:
receive a search query via a search input in a search region portion of the user interface;
cause a plurality of search results to be presented in the search region portion of the user interface, wherein each of the plurality of search results corresponds to a digital asset, and wherein each of the plurality of elements is selectable;
receive a selection of one of the search results in the plurality of search results, wherein the selected digital asset corresponds to selected search result.

11. The system of claim 10, wherein the hardware processor is further configured to:
cause a second search portion of the user interface to be presented;
identify a plurality of second search results based on the selected search result, wherein each of the plurality of second search results corresponds to a digital asset, and wherein each of the plurality of second search results is selected based on a similarity to the selected search result; and
cause the plurality of second search results to be presented in the second search portion of the user interface.

12. The system of claim 11, wherein the second search portion of the user interface includes an input for receiving an indication of a degree of similarity between each of the second search results and the selected search result.

13. The system of claim 9, wherein the user interface includes a markup language field, wherein the markup language field receives a command that comprises a reference to an element in the plurality of elements included in the layout of digital assets and an action to be performed on the referenced element in the plurality of elements.

14. The system of claim 13, wherein the hardware processor is further configured to perform the action on the referenced element by interpreting the command.

15. The system of claim 9, wherein the digital asset is a service associated with an application executing on the user device.

16. The system of claim 9, wherein the hardware processor is further configured to receive a payment in connection with a user account of the user device in response to determining that the digital asset has been selected.

17. A non-transitory computer-readable medium containing computer-executable instructions that, when executed by a processor, cause the processor to perform a method for creating a layout of digital assets, the method comprising:
receiving a user selection of a base form for the layout of digital assets;
based on the user selection of the base form, presenting the layout of digital assets in a layout portion of user interface presented on a display, wherein the layout of digital assets includes a plurality of elements, and wherein each element corresponds to a region of the layout of digital assets, and wherein each element can be associated with a digital asset;
receiving a selection of a digital asset from a group of available digital assets to be included in the layout of digital assets;

in response to receiving the selection of the digital asset, causing a representation of the digital asset to be presented in the layout of digital assets;

causing an image that represents the layout of digital assets to be created, wherein the image is associated with a Uniform Resource Locator (URL) that indicates a location of the image; and in response to determining that the URL has been selected on a user device, causing the image to be presented on the user device.

18. The non-transitory computer-readable medium of claim 17, wherein the method further comprises:

receiving a search query via a search input in a search region portion of the user interface;

causing a plurality of search results to be presented in the search region portion of the user interface, wherein each of the plurality of search results corresponds to a digital asset, and wherein each of the plurality of elements is selectable;

receiving a selection of one of the search results in the plurality of search results, wherein the selected digital asset corresponds to selected search result.

19. The non-transitory computer-readable medium of claim 18, wherein the method further comprises:

causing a second search portion of the user interface to be presented;

identifying a plurality of second search results based on the selected search result, wherein each of the plurality of second search results corresponds to a digital asset, and wherein each of the plurality of second search results is selected based on a similarity to the selected search result; and causing the plurality of second search results to be presented in the second search portion of the user interface.

20. The non-transitory computer-readable medium of claim 19, wherein the second search portion of the user interface includes an input for receiving an indication of a degree of similarity between each of the second search results and the selected search result.

21. The non-transitory computer-readable medium of claim 17, wherein the user interface includes a markup language field, wherein the markup language field receives a command that comprises a reference to an element in the plurality of elements included in the layout of digital assets and an action to be performed on the referenced element in the plurality of elements.

22. The non-transitory computer-readable medium of claim 21, wherein the method further comprises performing the action on the referenced element by interpreting the command.

23. The non-transitory computer-readable medium of claim 17, wherein the digital asset is a service associated with an application executing on the user device.

24. The non-transitory computer-readable medium of claim 17, wherein the method further comprises receiving a payment in connection with a user account of the user device in response to determining that the digital asset has been selected.

* * * * *

UNITED STATES PATENT AND TRADEMARK OFFICE
CERTIFICATE OF CORRECTION

Page 1 of 1

PATENT NO. : 11,537,778 B2
APPLICATION NO. : 17/140928
DATED : December 27, 2022
INVENTOR(S) : Marshall McLaury Monroe It is certified that error appears in the above-identified patent and that said Letters Patent is hereby corrected as shown below:

In the Claims

Column 26, Claim 1, Line 52:
"assets in a layout portion of user interface presented on" should be:
--assets in a layout portion of a user interface presented on--

Column 27, Claim 9, Line 56:
"layout of digital assets in a layout portion of user" should be:
--layout of digital assets in a layout portion of a user--

Column 28, Claim 17, Line 59:
"the layout of digital assets in a layout portion of user" should be:
--the layout of digital assets in a layout portion of a user--

Signed and Sealed this
Twenty-fifth Day of June, 2024

Katherine Kelly Vidal
*Director of the United States Patent and Trademark Office*